United States Patent
Tosik

(10) Patent No.: US 11,150,417 B2
(45) Date of Patent: Oct. 19, 2021

(54) SYSTEMS AND METHODS FOR ESTIMATING INSERTION LOSS IN OPTICAL FIBER CONNECTIONS AND FIBER LINKS USING DATA READING APPARATUS

(71) Applicant: CORNING RESEARCH & DEVELOPMENT CORPORATION, Corning, NY (US)

(72) Inventor: Grzegorz Tosik, Buczek (PL)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/000,760

(22) Filed: Aug. 24, 2020

(65) Prior Publication Data
US 2021/0072114 A1   Mar. 11, 2021

Related U.S. Application Data
(60) Provisional application No. 62/896,727, filed on Sep. 6, 2019.

(51) Int. Cl.
G02B 6/38 (2006.01)
G01M 11/00 (2006.01)
G01M 11/08 (2006.01)

(52) U.S. Cl.
CPC .......... *G02B 6/385* (2013.01); *G01M 11/088* (2013.01); *G01M 11/33* (2013.01)

(58) Field of Classification Search
CPC .... G01M 11/088; G01M 11/30; G01M 11/33; G01M 11/332; G01M 11/333;
(Continued)

(56) References Cited

U.S. PATENT DOCUMENTS

| 6,101,423 A | * | 8/2000 | Csipkes | ............ G06F 16/24578 700/117 |
| 6,898,368 B2 | * | 5/2005 | Colombo | ............. G02B 6/3807 385/147 |

(Continued)

FOREIGN PATENT DOCUMENTS

| CN | 102340420 A | 2/2012 |
| CN | 102346860 A | 2/2012 |

(Continued)

OTHER PUBLICATIONS

Kihara Mitsuru, "Optical Performance Analysis of Single-Mode Fiber Connections", Optical Fiber Communications and Devices, Chapter 11, 2012, pp. 239-256.

(Continued)

*Primary Examiner* — Gordon J Stock, Jr.
(74) *Attorney, Agent, or Firm* — Adam R. Weeks

(57) ABSTRACT

The systems and methods disclosed herein are used to estimate the insertion loss of an anticipated optical connection between a first optical connector having least one first optical fiber and a second optical connector having at least one second optical fiber. The method includes extracting first connector information stored on the first optical connector to obtain extracted first connector information and extracting second connector information stored on the second optical connector to obtain extracted second connector information. The estimated insertion loss of the anticipated optical connection between the first optical connector and the second optical connector is calculated using the extracted first connector information and the extracted second connector information. The total estimated insertion loss of a fiber link that includes one or more such optical connections can be used to qualify the fiber link without having to directly measure the fiber link insertion loss.

20 Claims, 16 Drawing Sheets

(58) Field of Classification Search
CPC ............. G01M 11/334; G01M 11/335; G01M 11/336; G01M 11/337; G01M 11/338; G02B 6/385
See application file for complete search history.

(56) References Cited

U.S. PATENT DOCUMENTS

| | | | | |
|---|---|---|---|---|
| 6,970,237 | B1 * | 11/2005 | Stolte | ............ G01M 11/31 356/73.1 |
| 7,081,808 | B2 * | 7/2006 | Colombo | ............ H04L 41/00 340/539.19 |
| 7,165,728 | B2 * | 1/2007 | Durrant | ............ G02B 6/3807 235/492 |
| 7,210,858 | B2 * | 5/2007 | Sago | ............ G02B 6/3807 385/88 |
| 9,064,022 | B2 | 6/2015 | Smith et al. | |
| 9,749,043 | B2 * | 8/2017 | Perron | ............ H04B 10/07955 |
| 10,161,829 | B2 * | 12/2018 | Brillhart | ............ G01M 11/3136 |
| 10,740,504 | B2 * | 8/2020 | Treptow | ............ G06F 30/18 |
| 11,022,761 | B2 * | 6/2021 | Miller | ............ G02B 6/385 |
| 2016/0042085 | A1 | 2/2016 | Smith et al. | |
| 2018/0349524 | A1 | 12/2018 | Kim et al. | |
| 2019/0041637 | A1 | 2/2019 | German et al. | |
| 2021/0025780 | A1 * | 1/2021 | Huang | ............ G01M 11/0214 |

FOREIGN PATENT DOCUMENTS

| | | |
|---|---|---|
| JP | 03-182962 A | 8/1991 |
| JP | 2000-213912 A | 8/2000 |
| JP | 2001-305372 A | 10/2001 |
| WO | 2018/209023 A2 | 11/2018 |

OTHER PUBLICATIONS

European Patent Application No. 20194707.4 European search report dated Feb. 3, 2021; 9 Pages; European Patent Office.

* cited by examiner

SYSTEMS AND METHODS FOR ESTIMATING INSERTION LOSS IN OPTICAL FIBER CONNECTIONS AND FIBER LINKS USING DATA READING APPARATUS

PRIORITY APPLICATION

This application claims the benefit of priority of U.S. Provisional Application No. 62/896,727, filed on Sep. 6, 2019, the content of which is relied upon and incorporated herein by reference in its entirety.

FIELD

The present disclosure relates to insertion loss in optical fiber links such as used in optical telecommunications systems, and in particular to systems and methods for estimating insertion loss in optical fiber connections and fiber links using data reading apparatus.

BACKGROUND

Data centers are used to store, process and distribute vast amounts of data and are essential for modern day businesses and are the backbone of the Internet. A modern data center has thousands of optical fiber cables, transponders, connectors, patch panels, and other optical interconnection components used in optical telecommunication systems and that define optical data transmission pathways, also referred to as data transmission links or optical fiber links or just "fiber links" for short. The fiber links are configured to support a select data transmission rate according to industry standards, such as 100 gigabits/second or "100 G." In the near future, fiber link data transmission rates are anticipated to increase to 400 G and then to 800 G.

Fiber link testing is carried out to ensure that a given fiber link actually supports the select data transmission rate. A fiber link can fall short of the data transmission requirement due to a number of reasons, including component failure and optical data signal loss, the latter of which referred in the art as simply as "fiber loss."

Data centers determine their fiber loss budgets based on the distances between the functional areas (e.g., a transmitter in one server rack and a receiver in another server rack) and the number of connection points along the fiber link. Fiber losses arise mainly due to loss from the insertion of components for the optical connection points in the fiber link ("insertion loss") and attenuation of the optical data signals as they travel through the length(s) of optical fiber that constitute the fiber link.

There are two main ways of fiber link testing or "certification" used in the optical telecommunications industry, namely Tier 1 certification and Tier 2 certification. Tier 1 certification measures insertion loss of the entire fiber link in decibels (dB) using an optical loss test that involves sending optical signals over the fiber link and making optical loss measurements. Tier 2 certification uses optical time domain reflectometry (OTDR). OTDR can provide insight into the loss of specific connection points and length of the cable but also requires making an actual measurement of optical signals transmitted over the fiber link using OTDR equipment operated by field personnel. Thus, both the Tier 1 and Tier 2 testing methods are time consuming, equipment intensive, personnel intensive and as such represent a significant source of time delay and expense when performing data center cabling.

SUMMARY

Data center owners would like to reduce fiber link testing costs and decrease cabling installation time. The systems and methods disclosed herein can be used to replace expensive fiber link qualification equipment. The use of data reading apparatus to read connector information from data components on the connectors and to calculate an estimate of the insertion loss of the one or more connections in the fiber link represent a simple and effective approach to qualifying fiber links, including multifiber fiber links.

An embodiment of the disclosure is directed to a method of estimating insertion loss of an anticipated optical connection between a first optical connector that supports at least one first optical fiber and a second optical connector that supports at least one second optical fiber. The method comprises: extracting first connector information stored on the first optical connector to obtain extracted first connector information; extracting second connector information stored on the second optical connector to obtain extracted second connector information; and calculating an estimated insertion loss of the anticipated optical connection between the first optical connector and the second optical connector using the extracted first connector information and the extracted second connector information.

Another embodiment of the disclosure is directed to a method of estimating an insertion loss of an anticipated optical connection between a first optical connector that supports first optical fibers and a second optical connector that supports second optical fibers. The method comprises: securing to the first optical connector a first data component that includes first fiber offset data for the first optical fibers; securing to the second optical connector a second data component that includes second fiber offset data for the second optical fibers; using a data reading apparatus to rear the first and second data components and obtain the first and second fiber offset data; calculating in the data reading apparatus an estimated insertion loss between the first and second optical connectors by using the obtained first and second fiber offset data; and comparing the estimated insertion loss to a threshold insertion loss and forming a maintained physical connection between the first and second optical connectors if the estimated insertion loss is less than the threshold insertion loss.

Another embodiment of the disclosure is directed to a method of qualifying a potential new fiber link that would result from an optical connection with an existing fiber link, wherein the optical connection would be between a first optical fiber that is supported by a first optical connector and a second optical fiber that is supported by a second optical connector, and wherein the existing fiber link has an existing fiber link insertion loss $IL_{FL}$. The method comprises: a) extracting first connector information from a first data component located on or proximate to the first optical connector, and extracting second connector information from a second data component located on or proximate to the second optical connector; b) calculating an estimated insertion loss $IL_{1-2}$ between the first and second optical fibers of the first and second optical connectors; c) estimating a total insertion loss of the new fiber link as $IL_T = IL_{1-2} + IL_{FL}$; and d) comparing the estimated total insertion loss $IL_T$ of the new fiber link to a total insertion loss tolerance $IL_{TOL-T}$ of the new fiber link determine whether $IL_T < IL_{TOL-T}$, wherein the condition $IL_T < IL_{TOL-T}$ constitutes a qualified condition for the new fiber link.

Another embodiment of the disclosure is directed to a system for estimating insertion loss of an anticipated optical connection between a first optical connector that supports at least one first optical fiber and a second optical connector that supports at least one second optical fiber. The system comprises: a first data component that stores first connector information and that resides on or near the first optical connector; a second data component that stores second connector information and that resides on or near the second optical connector; a data reading apparatus configured to read the first data component and the second data component to extract the first connector information and second connector information stored therein and also configured with instructions embodied in a non-transitory computer-readable medium to calculate the estimated insertion loss of the anticipated optical connection between the first and second fibers using the extracted first connector information and the extracted second connector information and performs a comparison of the estimated insertion loss to an insertion loss tolerance.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain principles and operation of the various embodiments. As such, the disclosure will become more fully understood from the following Detailed Description, taken in conjunction with the accompanying Figures, in which.

DETAILED DESCRIPTION

Figure 1A:
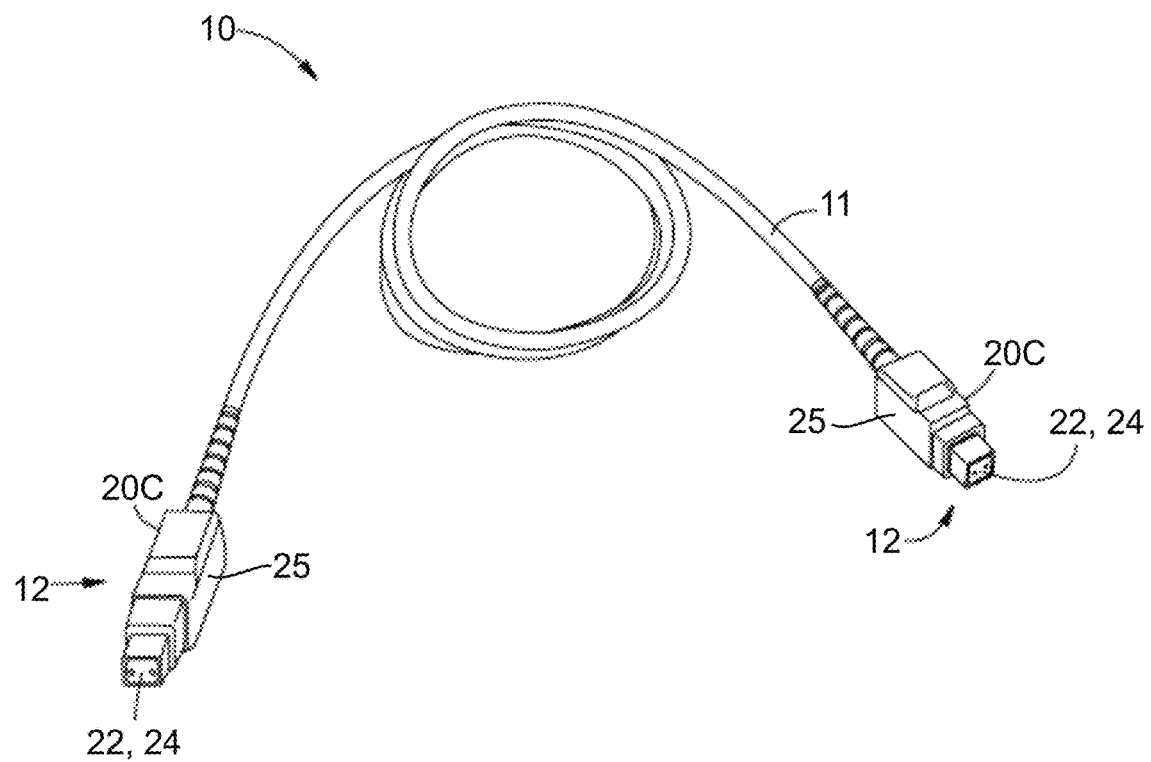
FIG. 1A is an elevated view of an example cable assembly.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The symbol "µm" used herein stands for "micron," which is $1 \times 10^{-6}$ meter.

The use of ellipsis " . . . " in the Figures is for ease of illustration and means that the component or components that is/are cut off in the Figure actually continues/continue on in the direction of the ellipsis for an additional distance.

The term "connector" as used herein is short for "optical connector" and means any optical connection device, assembly, or apparatus for establishing a connection that involves optical alignment of one or more first optical waveguides to respective one or more second optical waveguides, and mechanical retention of such alignment. In an example, the optical waveguides are optical fibers. The term "cable connector" is used to refer to a connector that is part (e.g., terminates) a cable assembly. The term "device connector" is used to refer to a connector that is part of a telecommunications device. In some of the examples below, a device connector has a female configuration and comprises a connector adapter.

The term "connector information" means any information about a given connector, including but not limited to serial number, type of connector, number of fibers, polarity, fiber configuration, manufacturer, manufacture date, fiber offset data (e.g., one or more types of fiber offsets, as described below), etc. For convenience, the connector information can be divided into two main sets of information, namely connector identification data Da readily available from inspection or observation, and fiber offset data $D_{FO}$ obtained by making fiber offset measurements of the given connector, as explained below. In an example, connector information includes at a minimum the fiber offset data.

The term "maintained physical connection" between connectors means establishing a connection between two connectors and then keeping the established connection for a period of time sufficient for the connection to be able to perform its intended function, e.g., to allow for optical signals to be transmitted between the two connectors as part of a fiber link.

In the discussion below, the insertion loss IL between the first and second fibers of first and second connectors is denoted by either IL or by $IL_{1-2}$.

Additionally, in the discussion below, some elements are introduced with generic reference signs (e.g., "element X"), and subsequently described with hyphenated reference signs (e.g., element X-1, X-2, etc.) to facilitate discussion that involves two or more corresponding/same elements. Reference signs may also include an alphabetical character combined with a number to associate a general element with an embodiment of that element. For example, "C" or "D" are used in some instances to associated a connector with a cable connector or device connector.

Cable Assembly

FIG. 1A is an elevated view of an example cable assembly 10. The cable assembly 10 includes a cable 11 having first and second opposite ends 12 respectively terminated by first and second optical fiber cable connectors ("cable connectors") 20C. The cable assembly 10 is also referred to in the art as a "jumper." An example cable connector 20C is shown in the close-up view of FIG. 1B. Although shown as a multifiber connector, the cable connectors 20C may be single fiber connectors in some embodiments (including both simplex and duplex configurations of such connectors). Each cable connector 20C has an end 22 (e.g., "output end 22" or "connector end") that includes an end surface 24. In an example, the end surface 24 is defined by a ferrule 26 and is also referred to as a ferrule end surface. In an example, the cable connector 20C can include a keying feature ("key") 21 adjacent the connector end 22.

The cable 11 of the cable assembly 10 supports at least one optical fiber ("fiber") 30 in a protective jacket ("cable jacket") 13, and the cable connectors 20C support the ends of the fiber(s) 30. Each fiber 30 has a fiber core centerline AC, as shown in the close-up inset of FIG. 1B. The fiber core centerlines AC in FIG. 1B and subsequent figures appear the same as central axes of the fibers 30, which is the case for a given fiber 30 when geometric center of a core 33 (see e.g. FIG. 3A) of the fiber 30 is the same as a geometric center of a cladding 34 of the fiber 30, i.e. there is no core-to-cladding eccentricity. Embodiments when this is not the case are also contemplated in this disclosure. In an example, the cable 11 and cable connectors 20C support multiple (i.e., integer n) fibers 30, which in an example can be arranged at the first and second cable connectors 20C in p rows and q columns (p×q), such as 1×8 (n=8), 1×16 (n=16), 2×16 (n=32), 1×12 (n=12), 2×12 (n=24), 4×12 (n=48), etc.

Figure 1B:
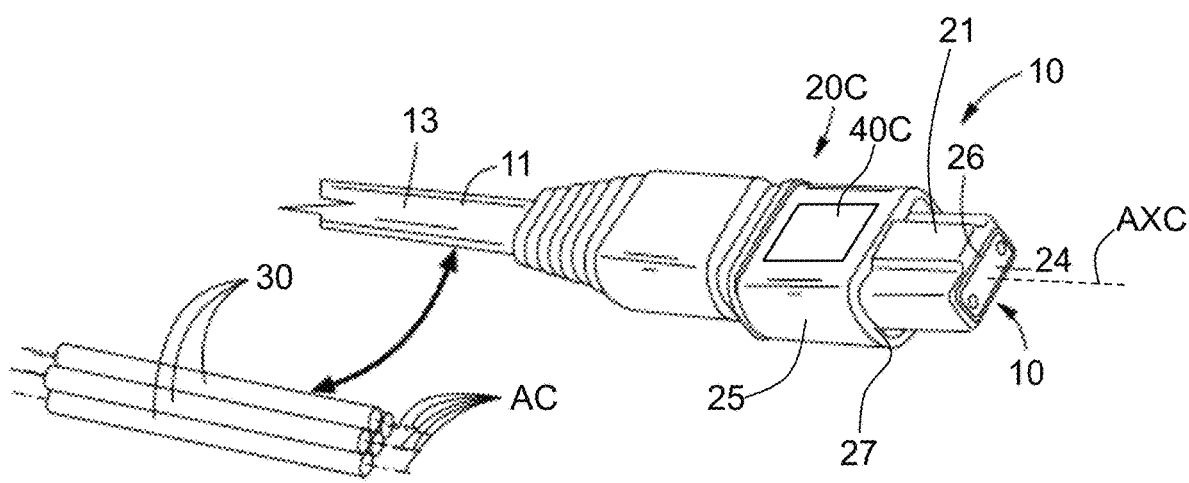
FIG. 1B is a close-up view of an example connector of the cable assembly of FIG. 1A and an example set (array) of optical fibers carried by the cable of the cable assembly.

The close-up view of FIG. 1B shows the cable connector 20C as including a data component 40, denoted 40C and referred to as a "cable data component." The cable data component 40C contains connector information (data) about the given cable connector 20C. As noted above, the connector information includes fiber offset data $D_{FO}$ obtained by connector measurements and pertinent to estimating an insertion loss when connecting to another connector of another cable or another device, as explained in greater detail below.

Figure 1C:
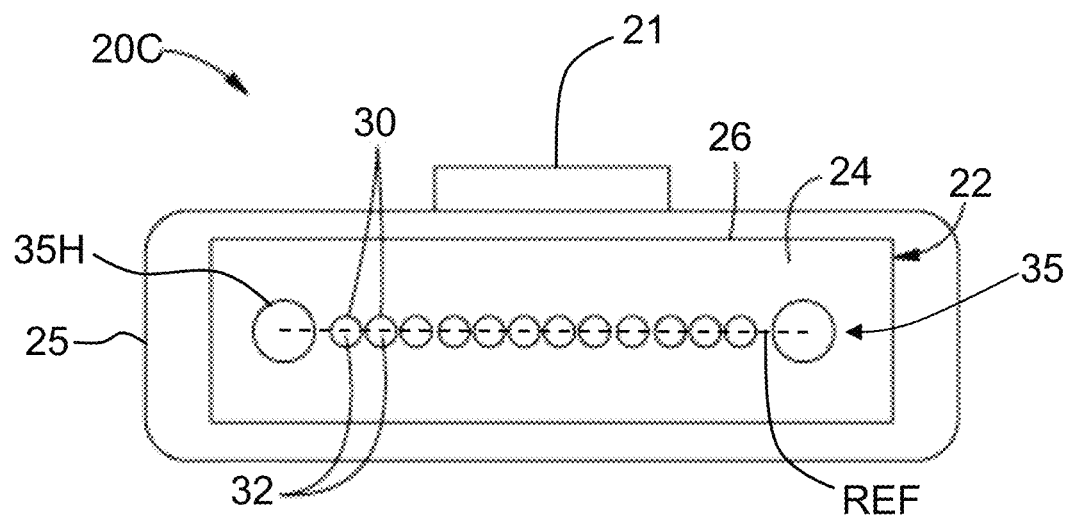
FIGS. 1C and 1D are schematic front views of two different example connectors, showing different example arrangements of the optical fibers at end surfaces of the two example connectors.
Figure 1D:
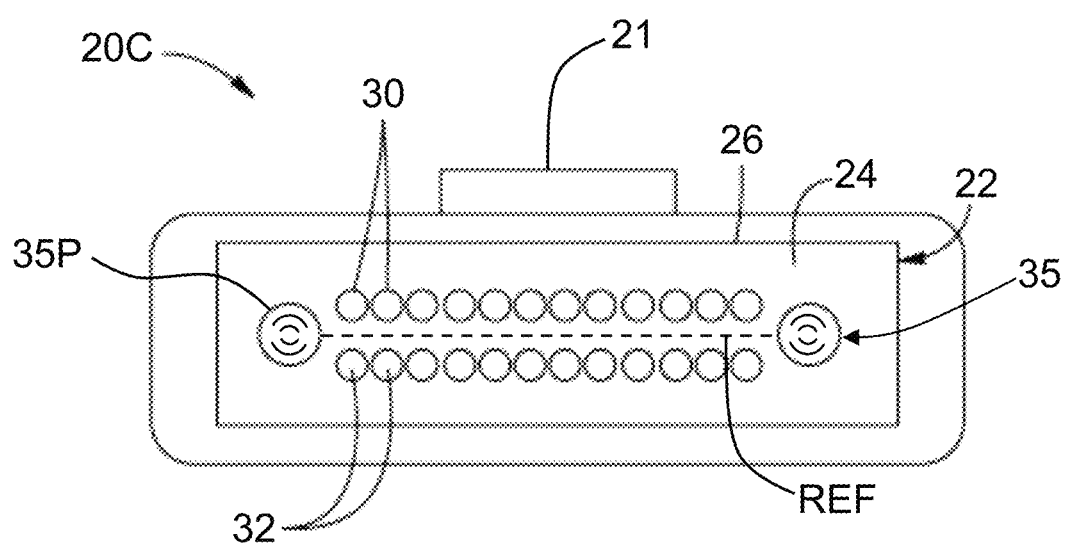

FIG. 1C is a schematic front view of one of the first and second cable connectors 20C and shows an example of a 1×12 arrangement of the fibers 30 at the end surface 24 of the cable connector 20C. FIG. 1D is similar to FIG. 1C, but shows an example of a 2×12 arrangement of the fibers 30 at the end surface 24 of one of the first and second cable connectors 20C. Each fiber 30 in the cable assembly 10

(FIG. 1) has first and second end faces 32 that terminate at or proximate to the respective end surfaces 24 of the first and second cable connectors 20C. In an example, the cable 11 can include multiple fibers 30 formed as a ribbon using matrix material, and the cable jacket 13 can have an elongate cross-sectional shape. Alternatively, the cable 11 can include multiple fibers 30 that are not bound together by matrix material and are thus "loose fibers." In an example, the fibers 30 have a "polarity" at the end surface 24, meaning that a given fiber end face 32 can have an assigned function of being interfaced with a transmitting fiber or a receiving fiber of another connector or of a device (e.g., a transmitter, a detector, or a transceiver). The cable connector 20C of FIG. 1C is shown as having alignment features 35 in the form of alignment holes 35H in the connector end surface 24, while in FIG. 1D the alignment features 35 are in the form of alignment pins 35P that extend from the connector end surface 24. Reference lines REF are shown in FIGS. 1C and 1D and can be used for measuring fiber properties (e.g., fiber offsets), as discussed below. In an example, the reference lines REF are based on the locations of the alignment features 35.

The cable connectors 20C, as well as the other connectors mentioned herein, can be of the type known and used in the field of optical connectivity, such as multifiber push-on/pull-off (MPO)-type connectors or LC-type connectors (e.g., for embodiments with simplex or duplex configurations). The fibers 30 can be single mode fibers, multimode fibers, "universal" mode fibers, or other types of optical fibers. Likewise, the cable 11 can be a type of cable other than the example cable assembly 10 shown in FIG. 1A.

Figure 2A:
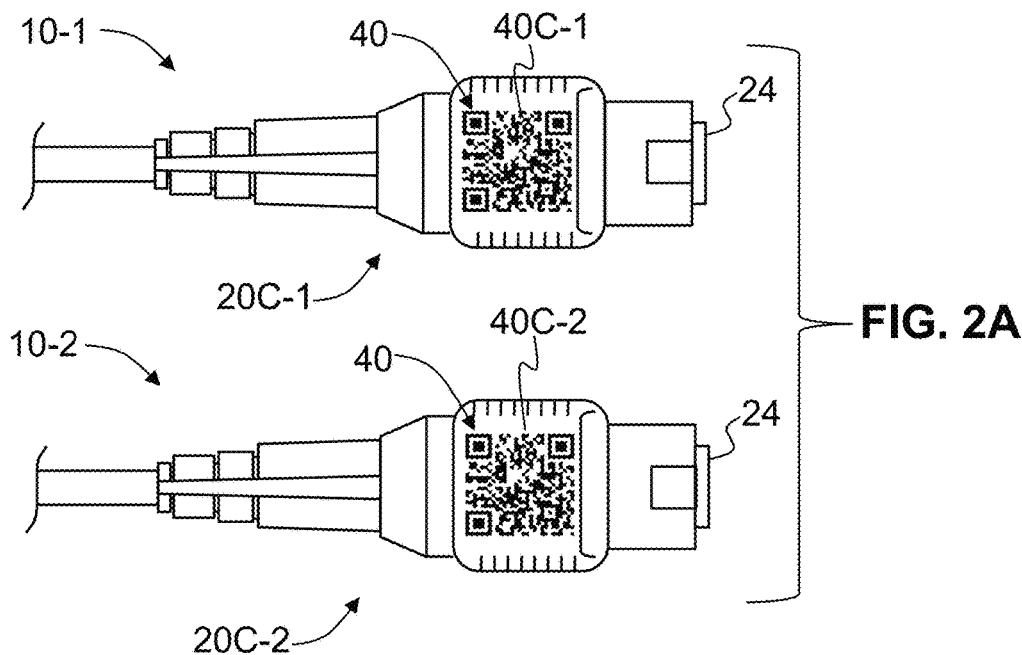
FIG. 2A is a top-down view of two connectors of two different cable assemblies, showing each connector supporting a data component that includes connector information.

FIG. 2A is a close-up top-down view of end portions of two example cable assemblies 10, denoted 10-1 and 10-2, whose cable connectors 20C are respectively denoted 20C-1 and 20C-2. The cable assemblies 10-1 and 10-2 include respective cable data components 40C, respectively denoted 40C-1 and 40C-2 and shown by way of example as a two-dimension bar code, such as a QR code. Other types of data components 40C, such as a linear bar code, communication tag (e.g., radio-frequency identification (RFID) tag or near-field communication (NFC) tag), etc. capable of storing connector information can also be employed.

Figure 2B:
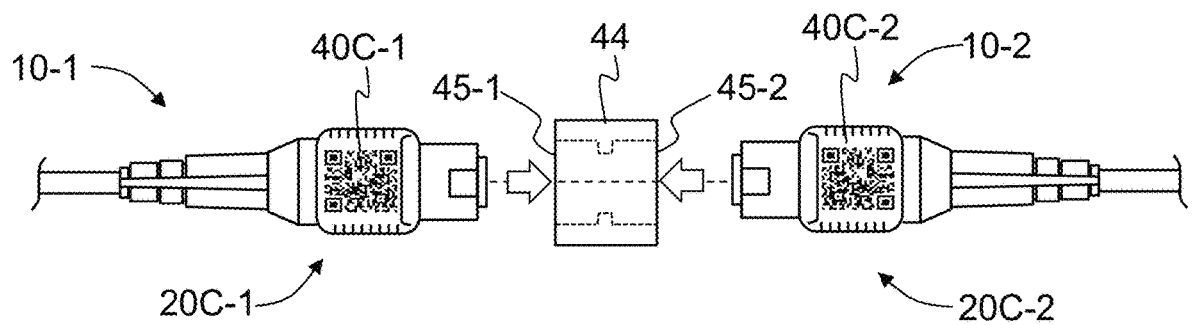
FIG. 2B is a top-down view that shows the two connectors of FIG. 2A along with an adapter, with arrows representing the two connectors being brought together through respective adapter ports of the adapter to establish an optical connection between the optical fibers supported by the two cable assemblies.
Figure 2C:
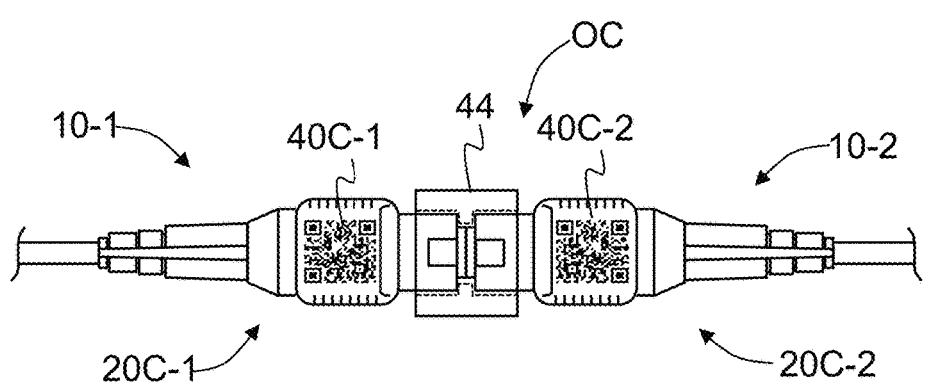
FIG. 2C is similar to FIG. 2B and shows the two connectors optically connected using the adapter to form an optical connection.

FIGS. 2B and 2C show the cable connectors 20C-1 and 20C-2 of the two cable assemblies 10-1 and 10-2 being brought together and then operably engaged (interfaced) so that the individual fibers 30 of the two connectors are in optical communication through their respective confronting (interfaced) end faces 32. In an example, an adapter 44 with opposing connector ports 45-1 and 45-2 is used to align and support the respective cable connectors 20C-1 and 20C-2 to operably engage the two connectors using the two connector ports of the adapter to establish an optical connection OC.

Figure 2D:
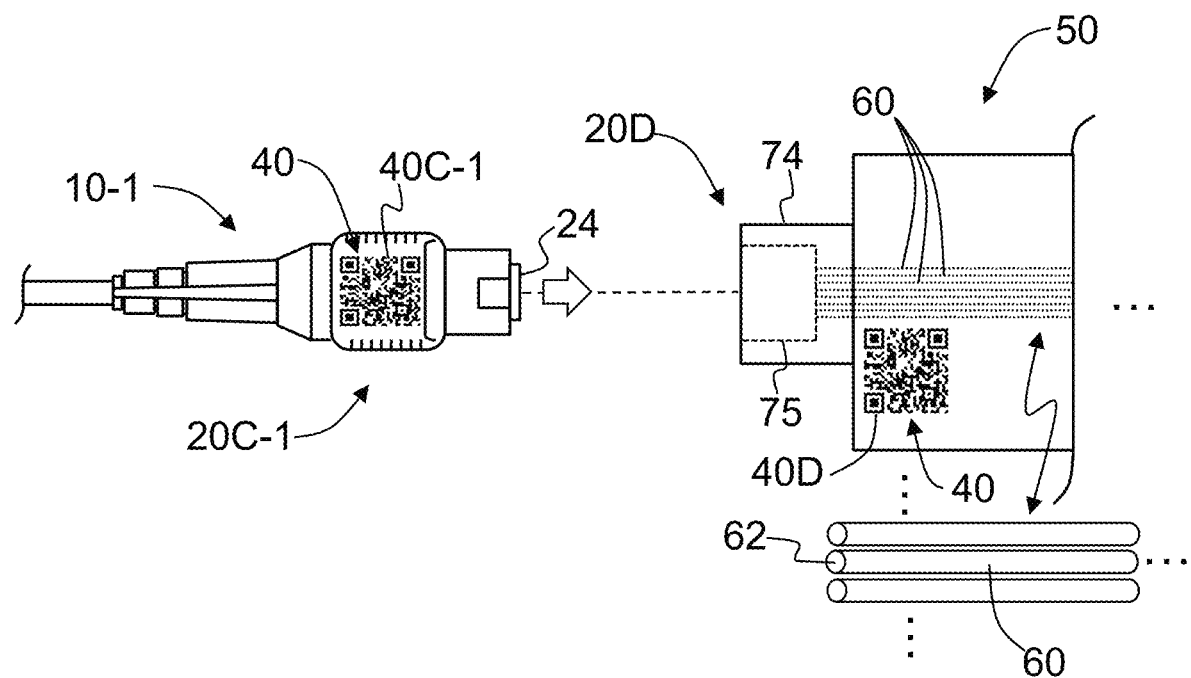
FIG. 2D is a top-down view of a connector of a cable assembly and a connector of a telecommunications device, showing each connector supporting a data component that includes connector information, and shown an arrow to represent the two connectors being brought together.
Figure 2E:
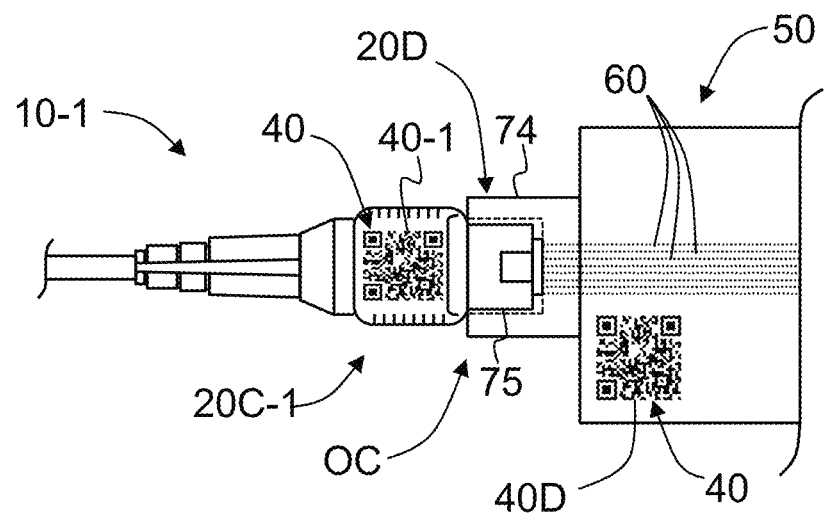
FIG. 2E is a top-down view that shows the connectors of FIG. 2D in a mated configuration whereby an optical connection is established between optical fibers or waveguides supported by the two connectors.

FIGS. 2D and 2E are similar to FIGS. 2B and 2C and illustrate an example of a cable connector 20C-1 of a cable assembly 10-1 being operably engaged with a device connector 20D of a telecommunications device 50, such as a patch panel or module, to form an optical connection OC. The term "module" is used in this disclosure in a broad sense, referring to interchangeable items for another, larger hardware item (e.g. a housing that mounts to an equipment rack). In this regard, a module may alternatively be referred to as a "fiber optic cassette" (or simply "cassette").

The telecommunications device 50 supports optical waveguides 60, which can be optical fibers. The optical waveguides 60 have end faces 62 and usually have substantially the same optical properties of the fibers 30 to optimize optical coupling efficiency, i.e., to minimize insertion loss. For example, the optical waveguides 60 can be the same type of optical fiber as fibers 30. The device connector 20D of the telecommunications device 50 is shown by way of example as being formed using a connector adapter 74 having a connector port 75 configured to receive and engage an end portion of the cable connector 20C so that the end faces 32 of the optical fibers 30 are aligned and interfaced with corresponding end faces 62 of the optical waveguides 60. A data component 40 in the form of a device data component 40D resides on or adjacent the device connector 20D and includes connector information about the given device connector 20D.

Insertion Loss

Even if the cable connectors 20C-1 and 20C-2 in FIGS. 2A-2C are identical and even if optical waveguides 60 in FIGS. 2D and 2E are the same type of optical fiber as fibers 30, there is always some amount of insertion loss between the aligned and interfaced fibers when optically engaging the two cable connectors 20C-1, 20C-2 or the cable connector 20C to the telecommunications device 50. An important question in optical telecommunications systems is whether the insertion loss is acceptable for a given fiber link.

Insertion loss IL between two optical fibers is a measure of the transmission T of light between the transmitting fiber or waveguide and the receiving fiber or waveguide. The transmission T is given by:

$$T = P_T / P_R$$

where $P_T$ is the amount of transmitted light (e.g., the transmitted light intensity) that makes it to the receiving fiber/waveguide and PR is the total amount of input light carried by the transmitting fiber/waveguide.

The insertion loss IL is given by:

$$IL = -10 \log(T).$$

In other words, the insertion loss is a logarithmic measure of the optical transmission T, and the units of insertion loss are in decibels (dB). The insertion loss IL for a multifiber optical fiber connector ("multifiber connector") can be identified as the set of insertion losses IL (e.g., $IL_1, IL_2, \ldots IL_n$) defined by the n optical fibers 30 in the multifiber connector. In the examples discussed below, the cable connectors 20C and the device connectors 20D are assumed to be multifiber connectors unless otherwise stated.

FIG. 3A through FIG. 6 are schematic views that include two example fibers 30-1 and 30-2 and illustrate example types of fiber mismatches or "offsets" and their corresponding offset measurement parameters. Note that in the examples shown the given measurement parameter can be defined relative one of the fibers (fiber 30-1) serving as a reference or ideal fiber, so that in the examples the measurement parameters pertain to the other fiber 30-2, which can be consider as the non-ideal or "test" fiber. The measurement parameters can also be measured relative to a reference position or reference feature on the given connector, such as a reference line REF that passes through the centers of the alignment holes 35H (see FIG. 1C) or alignment pins 35P (see FIG. 1D).

Figure 3A:
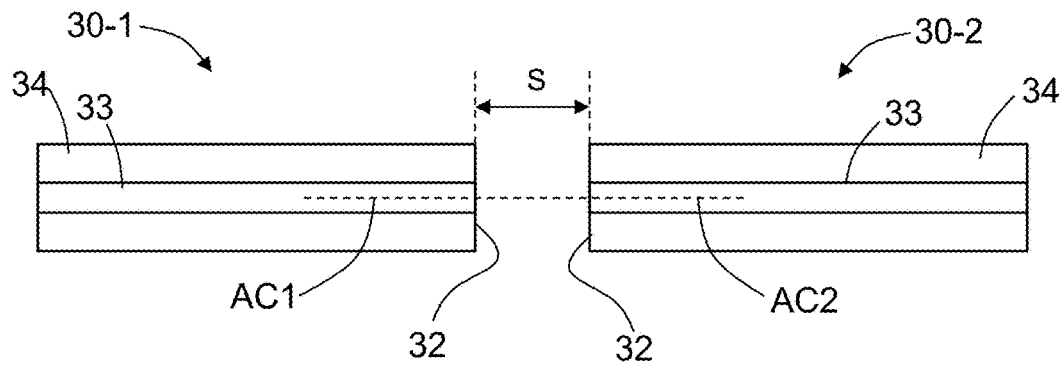
FIG. 3A is a close-up side view of the end portions of first and second optical fibers illustrating an example optical connection between the first and second optical fibers wherein fiber end faces are spaced apart by a distance S.

FIG. 3A is a close-up view of end portions of first and second fibers 30-1 and 30-2. Each of these fibers 30 has a core 33 and a cladding 34 and respective fiber core center-lines AC1 and AC2, which are shown coaxial in FIG. 3A to indicate that the two fiber cores 33 are aligned. FIG. 3A shows an example where the respective end faces 32 of the first and second fibers 30-1 and 30-2 are confronting and spaced apart by a distance or spacing S. Thus, the measurement parameter for this type of fiber offset is S and the transmission $T_S$ that describes the optical communication between the two spaced apart fibers 30-1 and 30-2 through their respective end faces 32 is given by:

$$T_S=[Z^2+1]^{-1},$$

wherein $Z=\lambda S/(2\pi n\omega^2)$, and where $\lambda$ is the wavelength of light, n is the refractive index of the medium between the fiber end faces 32, and w is the mode field diameter (MFD) of the fibers 30-1 and 30-2, which is assumed in this case to be the same for both fibers 30-1 and 30-2 and can be calculated using known techniques in the art based on the fiber configuration (e.g., the Petermann II method).

Figure 3B:
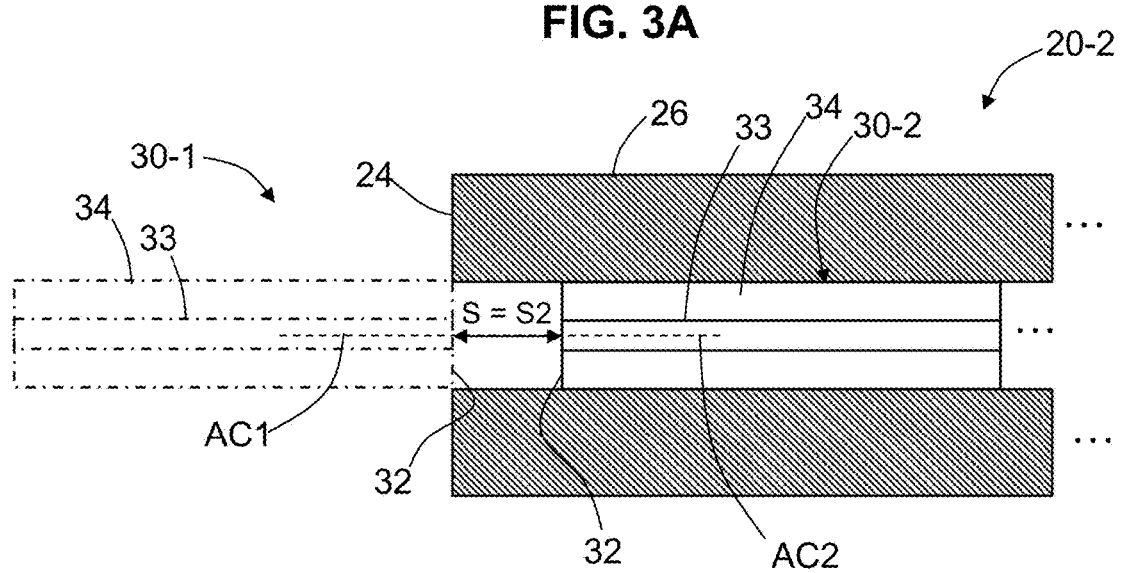
FIG. 3B is similar to FIG. 3A and shows an example where the distance S is denoted S2, associated with a second connector that holds the second optical fiber, and is measured from an end surface of a ferrule that supports the second optical fiber in the second connector.
Figure 3C:
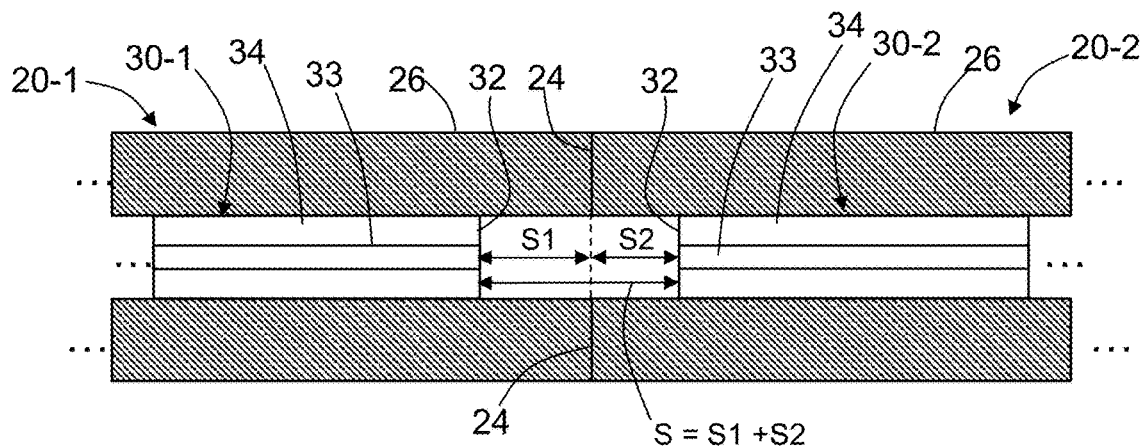
FIG. 3C is similar to FIG. 3B and shows an example where the distance S includes contributions from the first and second connectors that respectively support the first and second optical fibers so that the spacing distance S=S1+S2, i.e., the sum of the spacings associated with the first and second connectors.

In an example, the distance S2 is taken to be the distance from end face 32 of the second fiber 30-2 to the end surface 24 of the connector 20-2 (e.g., ferrule end surface for a cable connector 20C-2), i.e., the end surface 24 is used as a reference surface for measuring S, as shown in FIG. 3B. This assumes that the other (first) fiber 30-1 (shown in phantom) is right up against the end surface 24 of the connector 20-2 that supports the second fiber 30-2. In this case, S=S2. FIG. 3C shows the case where the first and second fibers 30-1 and 30-2 are supported by respective connectors 20-1 and 20-2, with the fibers 30-1 and 30-2 having respective spacings S1 and S2 relative to the contacted connector end surfaces 24 so that that total separation S=S1+S2.

Figure 4A:
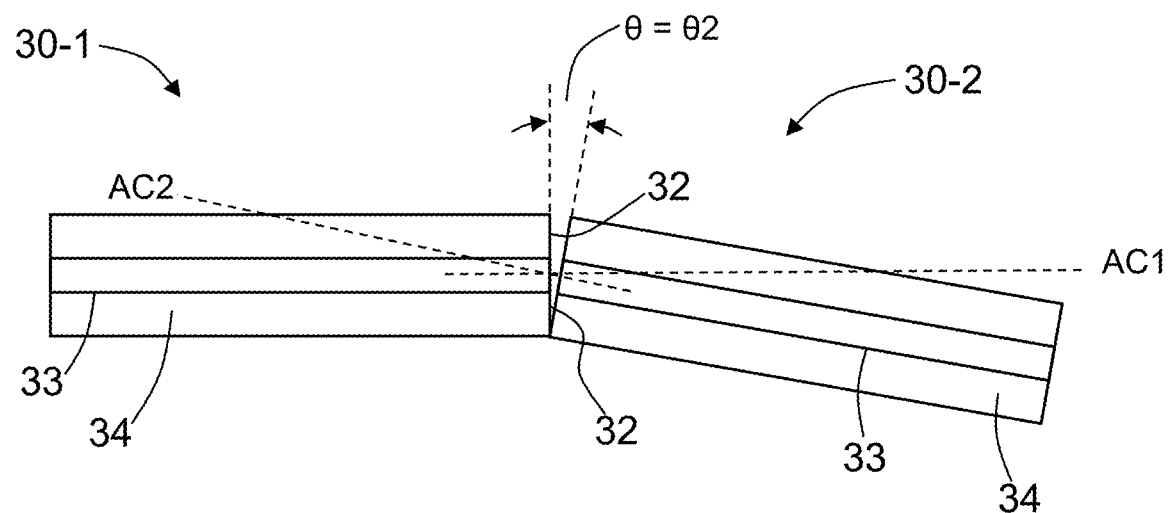
FIG. 4A is similar to FIG. 3A and shows an example of a tilt offset $\theta$ between the first and second optical fibers.

FIG. 4A is similar to FIG. 3A and shows an example of an angular offset θ of the end face 32 of the second fiber 30-2 measured relative to the end face 32 of the first fiber 30-1. The measurement parameter for this angular offset is the offset angle θ and the transmission $T_\theta$ for optical communication through the respective end faces 32 of the two angularly offset (misaligned) fibers 30-1 and 30-2 is given by:

$$T_e=\exp\{-(\pi n\omega\theta)^2/\lambda^2\}.$$

Figure 4B:
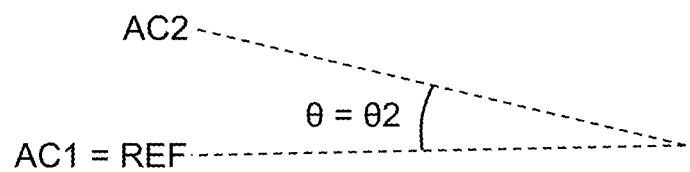
FIG. 4B is a schematic diagram that shows the tilt offset $\theta=\theta2$ as measured for a central axis of the second optical fiber relative to a central axis of the first optical fiber.

FIG. 4B is a schematic diagram that shows the angular offset θ as being measured relative to the respective fiber core centerlines AC1 and AC2 of the first and second fibers 30-1 and 30-2 (which is equivalent to the end face measurement of the angular offset θ), with the fiber core centerline AC1 serving as a reference line REF so that that angular offset θ=θ2.

Figure 4C:
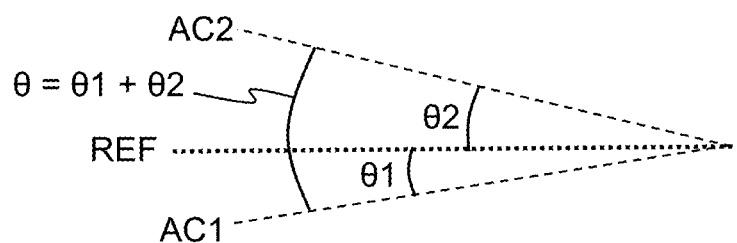
FIG. 4C is similar to FIG. 4B and illustrates the tilt offset $\theta=\theta1+\theta2$ as included contributions from the offsets of the first and second optical fibers.

FIG. 4C is similar to FIG. 4B and shows respective angular offsets θ1 and θ2 for the first and second fibers 30-1 and 30-2 as measured relative to a reference line (e.g., a normal line to the end surface 24 of the connector 20-1, such as the connector axis AXC; see FIG. 1B) so that the angular offset θ=θ1+θ2.

Figure 5A:
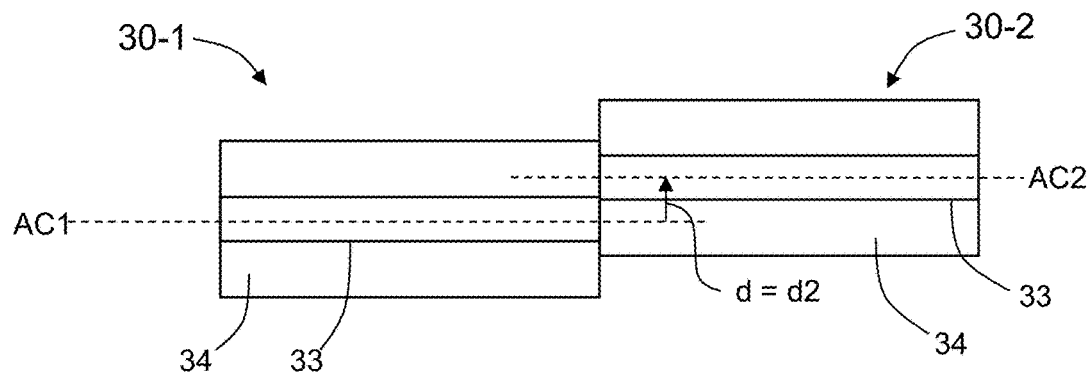
FIG. 5A is a close-up view of the end portions of first and second optical fibers showing an example lateral offset d=d2 for the second optical fiber as measured relative to a central axis of the first optical fiber.

FIG. 5A is another close-up view of the end portions of first and second fibers 30-1 and 30-2 and illustrates an example lateral offset d between the fiber core centerlines AC1 and AC2 of the first and second fibers 30-1 and 30-2. The measurement parameter for this situation is d and the transmission $T_d$ for the offset fibers 30-1 and 30-2 is given by:

$$T_d=\exp\{-d^2/\omega^2\}.$$

In FIG. 5A, the lateral offset d can be a property of the second connector 20-2 (not shown; see, e.g., FIG. 3B) that supports the second fiber 30-2, in which case the lateral offset d=d2.

Figure 5B:
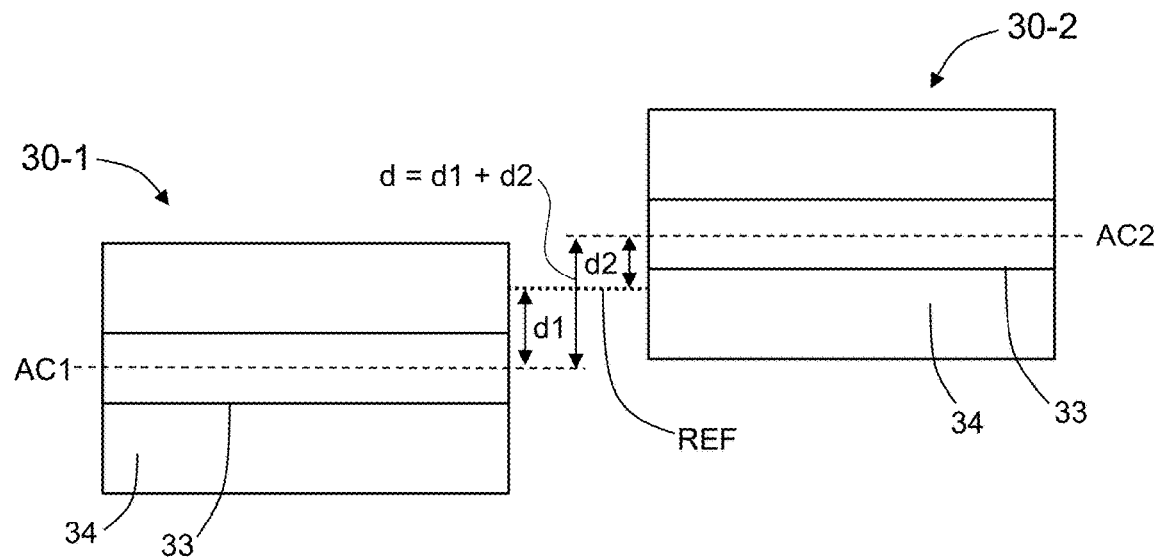
FIG. 5B is similar to FIG. 5A and shows the lateral offset d=d1+d2 based on the lateral offsets d1 and d2 of the first and second optical fibers, respectively, as measured relative to a reference position.

FIG. 5B is similar to FIG. 5A and shows the lateral offset d as measured relative to a reference line REF so that the lateral offset is a combination of the lateral offsets of the two fibers 30-1 and 30-1, i.e., d=d1+d2. In the close-up view of FIG. 5B, the fibers 30-1 and 30-2 are shown spaced apart for ease of illustration.

Figure 6:
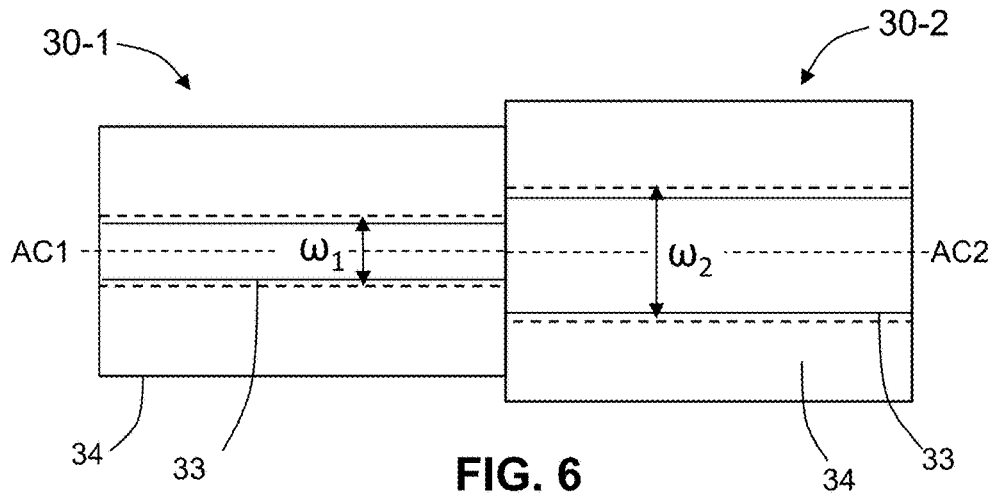
FIG. 6 is a close-up view of end portions of first and second optical fibers showing the first and second optical fibers having different first and second mode field diameters $\omega_1$ and $\omega_2$ that constitute a mode field diameter offset (mismatch).

FIG. 6 is a close-up view of end portions of the first and second fibers 30-1 and 30-2 illustrating an example of a mode field mismatch, wherein the MFDs of the two fibers 30-1 and 30-1 are denoted $\omega_1$ and $\omega_2$ respectively. The measurement parameters for this situation are $\omega_1$ and $\omega_2$ and the transmission $T_\omega$ for the mode field mismatched fibers 30-1 and 30-2 is given by:

$$T_\omega=(a/b)^2,$$

where $a=2\omega_1\omega_2$ and $b=\omega_1^2+\omega_2^2$. In FIG. 6, the MFDs $\omega_1$ and $\omega_2$ are shown as being slightly larger than the fiber cores 33.

Reflection losses at the fiber end faces 32 can also be accounted for using a transmission $T_R$. Assuming a small air-filled space S between the fiber end faces 32 on the order of the wavelength Λ, the transmission $T_R$ is given by:

$$T_R=A/[A+B]$$

where $A=(1-R_0)^2$ and $B=4R_0 \sin^2(2\pi nS/\lambda)$, where $R_0=[(n_1-n)/(n_1-n)]^2$, and where $n_1$ is the refractive index of the fiber cores 33. The main measurement parameter for calculation the transmission $T_R$ is the spacing S since the core index $n_1$ is taken to be that of the design specification for the fibers 30 being used.

The total transmission $T_T$ is found by multiplying the pertinent mismatch (offset) transmissions, i.e., $$T_T=T_S \cdot T_\theta \cdot T_d \cdot T_\omega \cdot T_R$$

while the total insertion loss $IL_T$ is given by:

$$IL_T=-10 \log(T_T)=-10 \log(T_S \cdot T_\theta \cdot T_d \cdot T_\omega \cdot T_R)$$

or from the know relationship for logarithms, $$IL_T=-10 \{\log (T_S)+\log (T_\theta)+\log (T_d)+\log (T_\omega)+\log (T_R)\}$$

A related expression for the insertion loss IL is given by what is known in the art as the Marcuse equation and is based on the angular offset, the lateral offset, and the mode field mismatch:

$$IL=-10 \log \{(a/b)^2+\exp \{(-2d^2)/b)-(\pi n/\lambda)^2 (a^2/b) \sin^2 \theta\}.$$

Both forms of expression for the insertion loss IL give substantially the same results for the given offsets. In either case, the calculated insertion loss is only an approximation or an estimate of the actual insertion loss that occurs in the field when two fibers are physically interfaced by operably engaging two connectors 20 (e.g. two cable connectors 20C or a cable connector 20C and a device connector 20D). This is due in part to the uncertainty in the measured parameters and the variations in these parameters that occur when making an actual physical connection between two connectors 20. A field technician can make a series of ten connections using the same two connectors and measure the insertion loss each time, yet will obtain a variation in the measured insertion losses due to the inability to place the two connectors in exactly the same relative positions, keeping in mind that offsets of a fraction of a micron can have a substantial impact on the insertion loss. Fortunately, estimations of the insertion loss can be good enough to compare to an insertion loss tolerance $IL_{TOL}$ (or "insertion loss threshold") to decide whether the given optical connection being considered can form a sufficiently low-loss optical connection to be used in the fiber link.

It is preferred that the insertion loss estimate made using the above calculations is as close as possible to the actual insertion loss experienced in the field for the given optical connection so that the best decision can be made about whether to use the optical connection in the field. This is because the decision of whether to use the optical connection being considered is only as good as the error in the estimate. For example, if an insertion loss estimate is 0.25 dB, the insertion loss tolerance $IL_{TOL}$ is 0.3 dB, and the error in the estimate of the insertion loss is 0.07 dB, there is a risk that the actual insertion loss of the connection will exceed the insertion loss tolerance $IL_{TOL}$.

To maximize the accuracy of the insertion loss estimate, it is preferred that above-described measurement parameters that constitute the fiber data for the fibers 30 of a given cable connector 20C or device connector 20D are made using the most accurate means available.

Obtaining the Fiber Offset Data

An aspect of the disclosure includes obtaining the connector identification data Da and the fiber offset data $D_{FO}$ for the given connector. As explained above, example fiber offset data $D_{FO}$ can generally include: the fiber identification number nf of the (multifiber) connector (e.g., fiber 1, fiber 2, ... fiber 12), the spacing S, the lateral offset d, the angular offset θ, and the MFD ω, i.e., a fiber offset data set $D_{FO}=\{nf, S, d, θ, ω\}$ for performing calculations of the estimated insertion loss IL. As also explained above, the connector data information Da stored in the data component 40 can include connector-related information, such as the connector identifier CI (e.g., the connector serial number or like identifier), the connector type CT, the cable assembly length CL, the polarity P of the fibers 30 (e.g., universal), the number n of fibers and the fiber arrangement FA (e.g., single row of 12 fibers), the mating configuration MC (male or female connector), etc. This connector information can be used to define a set of connector identification data $D_{CI}=\{CI, CT, CL, P, n, FA, MC, ...\}$. The fiber offset data $D_{FO}$ and the connector identification data Da can be encoded on the given data component 40 (e.g., cable data component 40C or device data component 40D) so that it is available to a field technician using an appropriate data reading apparatus, as also explained below. There are other ways to encode the pertinent connector information and the approach described above of using one sub-set of the connector information for insertion loss calculations and another sub-set of the connector information for identification purposes is provided as one non-limiting example of managing the connector information.

The fiber offset data $D_{OF}$ can be identified with a specific cable or device connector 20C or 20D, e.g., a first connector can be referred to as "connector 1" and the fiber offset data $D_{OF}=D_{OF1}=\{fn1, S1, d1, θ1, ω_1\}$, while a second connector can be referred to "connector 2" with the corresponding fiber offset data $D_{OF}=D_{OF2}=\{fn2, S2, d2, θ2, ω2\}$.

In an example, the connector measurements to obtain the fiber offset data $D_{OF}$ are performed using a non-contact systems and methods, such as described in U.S. Provisional Patent Application Ser. No. 62/878,799, entitled "SYSTEMS AND METHODS FOR MAKING A NON-CONTACT MEASUREMENT OF INSERTION LOSS FOR AN OPTICAL FIBER CONNECTOR," filed on Jul. 26, 2019, and which is incorporated by reference herein.

Figure 7A:
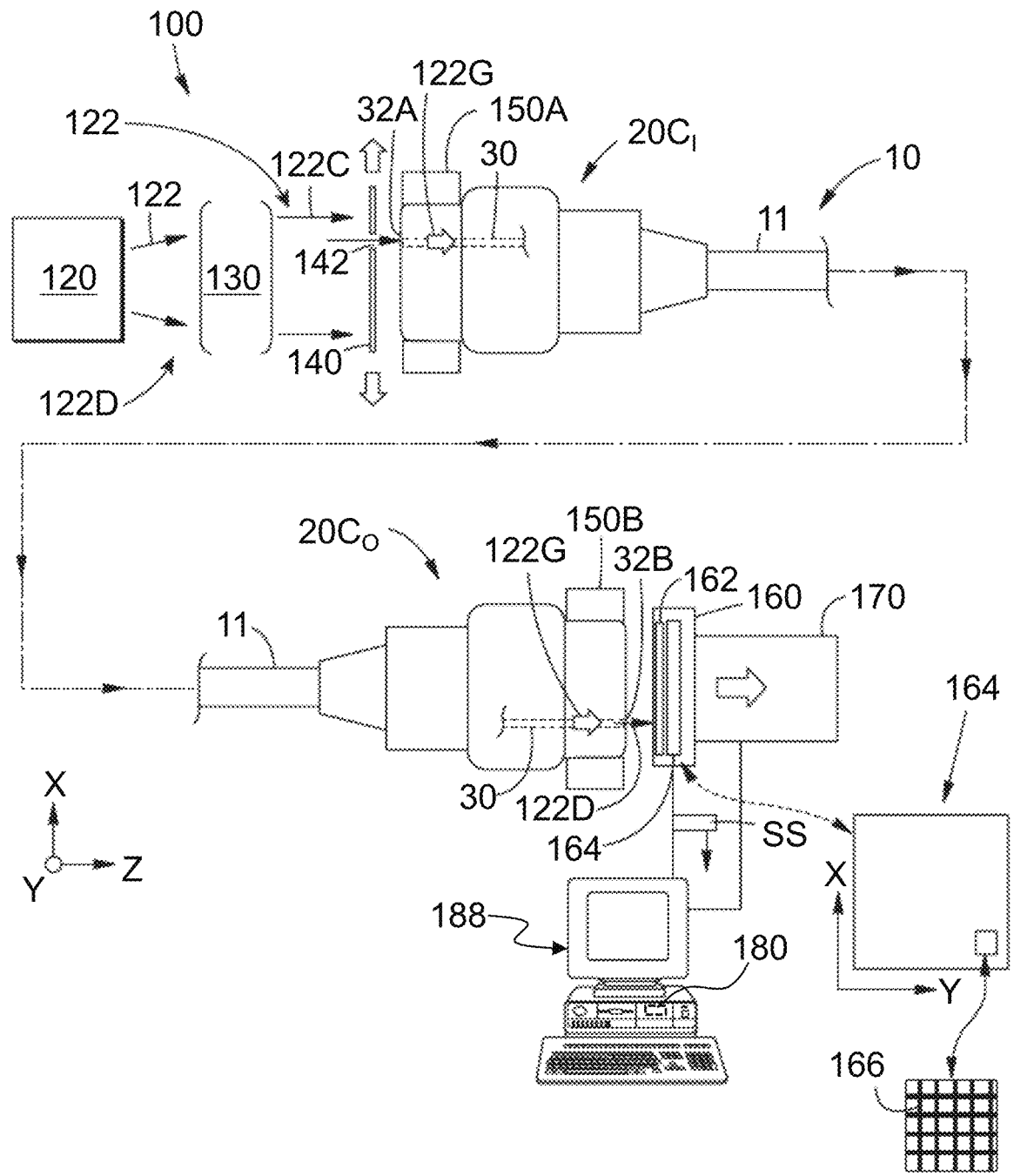
FIG. 7A is a schematic diagram of a non-contact measurement system used to obtain connector measurement data for a connector.

FIG. 7A is a schematic diagram of the non-contact measurement system ("system") 100 for measuring the insertion loss of the cable assembly 10, as taken from FIG. 2 of the above-referenced patent application.

The system 100 includes a light source 120 that emits light 122 of wavelength $λ_0$. In an example, the light source 120 comprises a light-emitting diode (LED) that operates at a wavelength $λ_0=940$ nm. A beam-conditioning optical system 130 is operably disposed to receive the light 122 and form conditioned light 122C. In an example, the emitted light 122 comprises divergent light 122D (also referred to as "diverging light beam 122D" or "output light beam 122D") and the beam-conditioning optical system 130 comprises a collimating optical system (not shown) so that the conditioned light 122C comprises substantially collimated light 122C.

The beam-conditioning optical system 130 can comprise one or more optical components as is known in the art. A movable (scanning) slit member 140 that includes at least one aperture or slit 142 can be operably disposed to selectively pass at least one portion of the conditioned light 122C. In an example, the slit member 140 is configured to be movable in the x-direction (referring to the coordinate system in FIG. 2) so that the aperture (slit) 142 can be selectively positioned along the x-direction (i.e., laterally positioned), as described in greater detail below. The slit member 140 can include multiple apertures (slits) 142 whose position correspond to the positions of select ones of the fibers 30.

The measurement system 100 includes a first connector support device 150A that supports an input cable connector $20C_1$ of the cable assembly 10 so that the input cable connector 20C resides immediately adjacent the slit member 140. The measurement system 100 further includes a second connector support device 150B that supports an output cable connector 20C of the cable assembly 10 so that the output cable connector $20C_O$ resides immediately adjacent a sensor device 160. In an example, the sensor device 160 includes a cover glass 162 (also referred to as "cover sheet 162") and a sensor array 164 (e.g., a CCD array) that includes light-sensing pixels 166. In an example, the sensor device 160 comprises a CCD camera. The sensor array 164 defines a sensor array plane.

The sensor device 160 is operably supported on a movable stage 170 so that the sensor device 160 can be moved in the z-direction. In an example, the movable stage 170 can also be moved in the x-direction and the y-direction for aligning the output cable connector $20C_O$ with the sensor device 160. A processor 180 is operably connected to the sensor device 160 to receive and process from the sensor device sensor signals SS representative of the intensity distribution of the detected output beams, which are introduced and discussed below. The processor 180 can optionally be connected to the movable stage 170 to control the movement of the sensor device 160 as described below. In an example, the processor 180 can be part of a computer or controller 188.

Figure 7B:
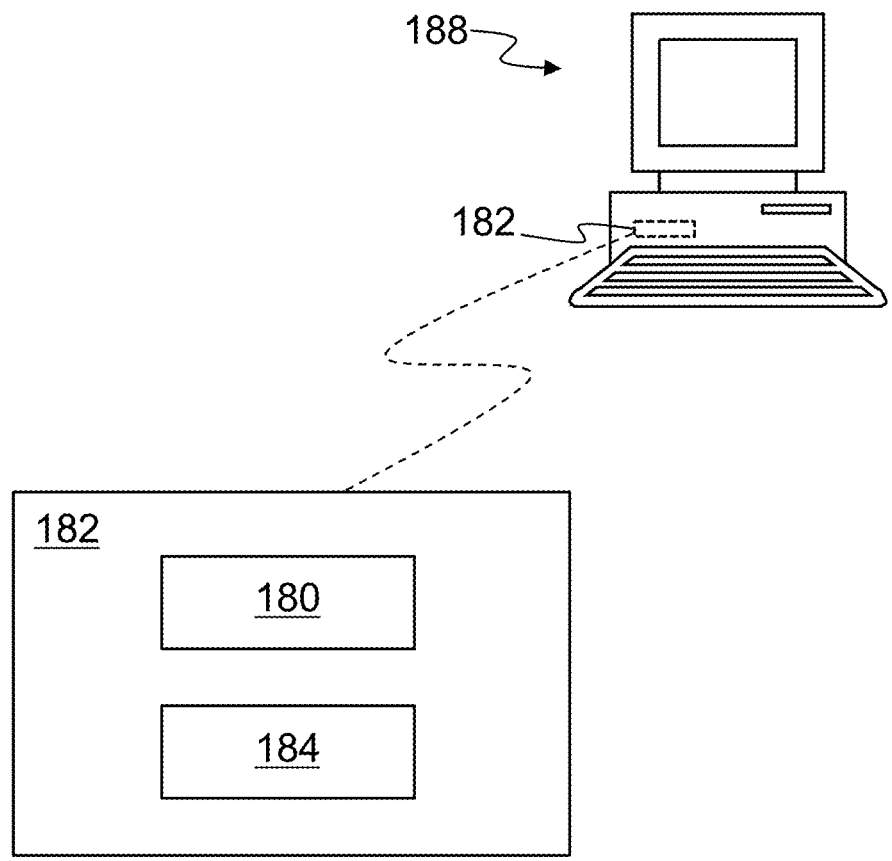
FIG. 7B is a schematic diagram of an example processing circuitry used in the non-contact measurement system of FIG. 7A.

In an example, the processor 180 can comprise a controller (e.g., controller 188) configured to control the various operations of system 100 as described below. To this end, FIG. 7B is a schematic representation of processing circuitry 182 for a computer or controller 188, with the processing circuitry 182 including the processor 180 and a memory 184. The processor 180 may be embodied in a number of different forms. For example, the processor 180 may be embodied as a microprocessor or other processing element, a coprocessor, a controller, or various other computing or processing devices including integrated circuits such as, for example, an ASIC (application specific integrated circuit), an FPGA (field programmable gate array), a hardware accelerator, or the like. In an example embodiment, the processor 180 may be configured to execute instructions stored in a memory 184 or otherwise accessible to the processor 180. As such, whether configured by hardware or software methods, or by a combination thereof, the processor 180 may represent an entity (e.g., physically embodied in circuitry) capable of performing operations according to embodiments this disclosure. Thus, for example, when the processor 180 is embodied as an executor of software instructions, the instructions may specifically configure the processor 180 to perform operations according to this disclosure.

Still referring to FIG. 7B, the memory 184 may include one or more non-transitory storage or memory devices such as, for example, volatile, and/or non-volatile memory that may be either fixed or removable. The memory 184 may be configured to store information, data, applications, instructions, or the like for enabling the apparatus to carry out various functions in accordance with example embodiments of this disclosure. For example, the memory 184 could be configured to buffer input data for processing by the processor 180. Additionally or alternatively, the memory 184 could be configured to store instructions for execution by the processor 180. As yet another alternative, the memory 184 may include one of a plurality of databases that may store a variety of files, contents, or data sets. Among the contents of the memory 184, applications (e.g., client applications or service application) may be stored for execution by the processor 180 in order to carry out the functionality associated with each respective application.

Referring back to FIG. 7A, in an example of the operation of system 100, the light source 120 emits light 122, which is received and conditioned by the beam-conditioning optical system 130 to form the aforementioned conditioned light 122C. The conditioned light 122C is then directed into the input end face 32A of one or more of the fibers 30. In an example, the wavelength $\lambda_0$ of the conditioned light is greater than the cut-off wavelength (i.e., $\lambda_0 > \lambda_{CO}$), so that only a single mode travels in each of the fibers 30. In this example, the beam-conditioning optical system 130 can be configured so that the conditioned light 122C has the same or a slightly larger numerical aperture (NA) than the fiber 30. In another example, wherein the wavelength $\lambda_0 < \lambda_{CO}$, the conditioned light 122C can be substantially collimated to ensure that only the fundamental mode of the fiber 30 is excited.

As noted above, the movable slit member 140 can include a single slit 142 that can align with a select fiber 30 or can have multiple slits 142 configured to align with select fibers 30 (e.g., every other fiber, every third fiber, non-adjacent fibers, etc.) for reasons discussed below. The conditioned light 122C coupled into each of the fibers 30 travels therein as guided light or a "guided wave" 122G. The guided wave 122G eventually reaches the output end face 32B of the fiber 30, where it is emitted as a diverging light beam 122D.

The movable stage 170 is used to place the sensor device 160 (or more accurately, the sensor array plane SP) at select axial distances or z-positions (z1, z2, . . . zn) away from the output end 22 (e.g., ferrule end surface 24 of ferrule 26) of the output cable connector $20C_O$. The term "axial distances" (or "axial positions") is used since the z-axis is substantially parallel to the fiber core centerlines AC of fibers 30. In an example, the movable stage 170 moves the sensor device 160 in increments of $\Delta z$, which in example can be in the range from 10 μm to 100 μm.

Each illuminated fiber 30 outputs a diverging output light beam 122D from its output end face 32B. The output light beam 122D is detected by the sensor array 164 of the sensor device 160 at the select z-positions. The sensor signals SS generated by the detection process are representative of the received output beams 122D at the different z-positions and correspond to intensity distributions of the detected output-beam images at the different z-positions.

The system 100 can then be used to establish one or more of the main measurement parameters {nf, S, d, θ, w} used for calculating (estimating) the insertion loss. This includes the following steps: 1) obtain at least one output-beam image 122D' for at least two different measurement positions, wherein as noted above the output-beam images have respective intensity distributions I(x, y; z); 2) perform curve fitting of the output-beam images to determine the main the beam parameters (maximum intensity $I_0$, a centroid location $(x_C(z), y_C(z))$ of the given intensity distribution, lateral offset d, and a spot size w(z) corresponding to the MFD w for each measurement position and also determine the coordinates $(x_0, y_0, z_0)$ of the fiber end face 32 and the MFD=$w(x_0, y_0, z_0)=w_0=\omega$.

In system 100, the lateral offset (i.e., offset error) d is measured relative to an ideal location on the output end face 32B of the given fiber 30 and the tilt offset is measured to an ideal central axis AC of the fiber core 33. In an example, the ideal locations of the output end faces 32B are determined based on a perfectly linear array of fibers having a perfect center-to-center spacing (e.g., 250 μm). In the absence of connector alignment pin geometry information, a best-case estimate is performed by positioning the ideal array of fibers 30 to achieve the lowest possible loss given the measured fiber locations.

In an example, some or all of the steps for determining the measurement parameters can be performed in the processor 180 using known mathematics software, such as MATLAB® math software from The Math Works, Inc., Natick, Mass.

In other examples, the fiber offset parameters can be measured using standard contact-based methods using reference connectors as known in the art.

Estimating Insertion Loss in the Field

Figure 8A:
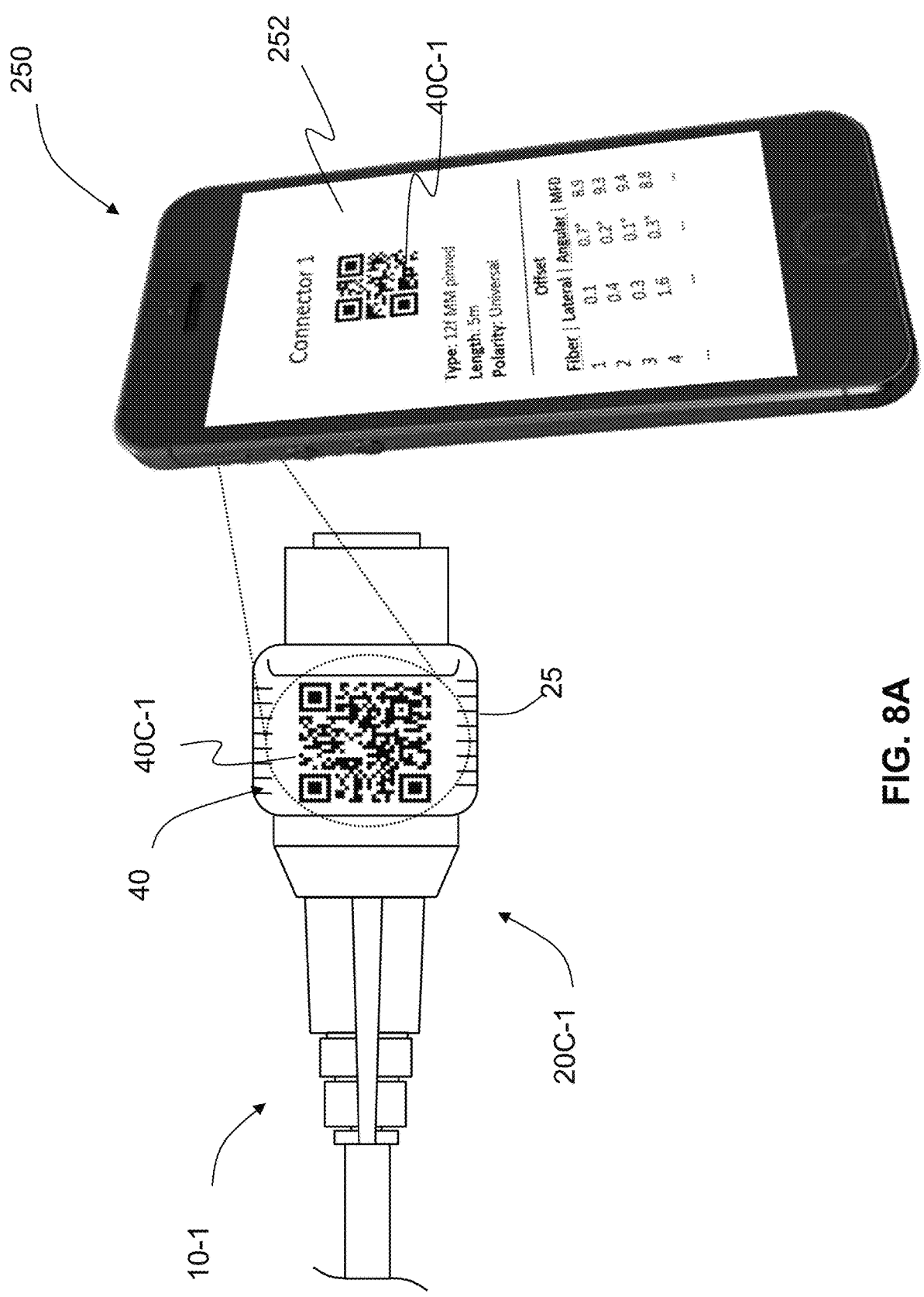
FIG. 8A is an elevated view of an example of a first connector of an example first cable assembly, showing a data reading apparatus reading connector information encoded in a data component on the first connector.

FIG. 8A is an elevated view of an example of the first cable connector 20C-1 of an example first cable assembly 10-1. The first connector 20C-1 includes its cable data component 40C-1 that includes (stores) the connector information ("first connector information"), namely the fiber offset data $D_{OF1}$ and optionally the connector identification data Da. A field technician or other user (not shown) brings a data reading apparatus 250 in proximity to the data component 40 to read the fiber offset data $D_{OF1}$ and connector identification data $D_{CL1}$ encoded in the data component 40C-1. In an example, the data reading apparatus 250 comprises a hand-held or other mobile computing device such as a smart phone (as shown), tablet, personal data assistant, etc. The data reading apparatus 250 includes a display screen 252 ("display 252") that displays the fiber offset data $D_{OF1}$ and connector identification data $D_{CL1}$ read from the cable data component 40C-1.

In the example shown in FIG. 8A, the display 252 is shown displaying example connector identification data Da in the form of the connector identifier CI1 as "Connector 1," the connector type CT1 as "12f MM pinned," the cable assembly length CL1 as "5 m," the polarity P1 as "universal," and the number n1 of fibers 30 as "12f." The fiber offset data $D_{OF1}$ is displayed with the fiber identification number fn1 for the connector fibers 30 shown listed in column form under the heading "Fiber." The lateral offset d, the angular offset θ, and the MFD w are presented as respective columns labeled "Lateral" and "Angular" and "MFD" all under the main heading of "Offset." A copy of the cable data component 40C-1 is also shown on the display 252.

Figure 8B:
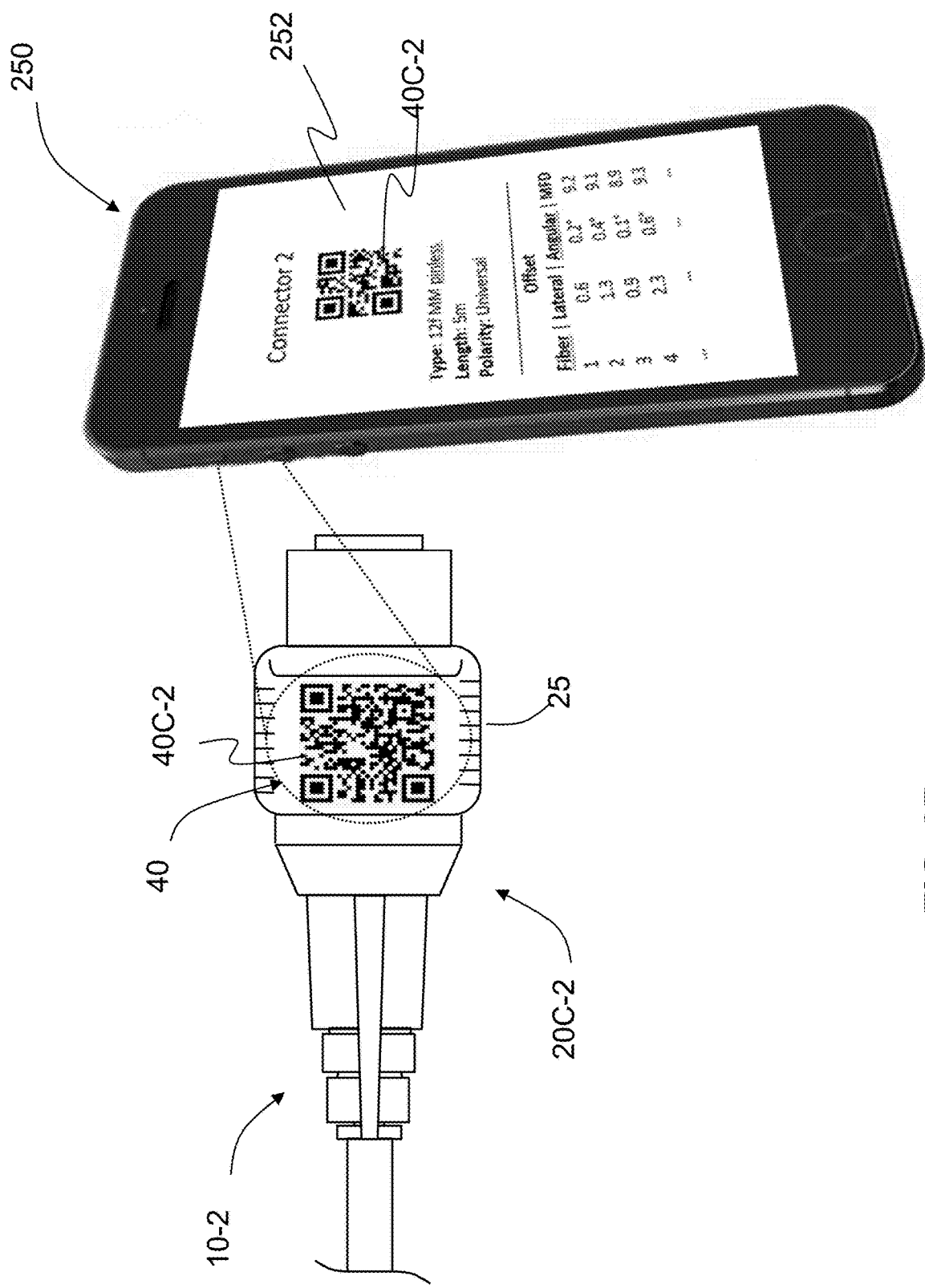
FIG. 8B is an elevated view of an example of a second connector of an example second cable assembly showing the data reading apparatus reading connector information encoded in a data component on the second connector.

FIG. 8B is similar to FIG. 8A and shows the data reading apparatus 250 reading the cable data component 40C-2 from the second cable connector 20C-2 of the second cable assembly 10-2. The corresponding connector information ("second connector information") read from the second cable data component 40C-2 is now displayed on the display 252 for the second data component 40C-2.

Note that at this point, there is no need to make an actual physical connection of the two cable connectors 20C-1 and 20C-2. Rather, the optical connection being evaluated can be thought of as an "anticipated" connection, with the actual physical connection for use in a fiber link being made after the insertion loss of the anticipated connection is estimated and determined to satisfy at least one insertion loss criterion as explained below.

Figure 8C:
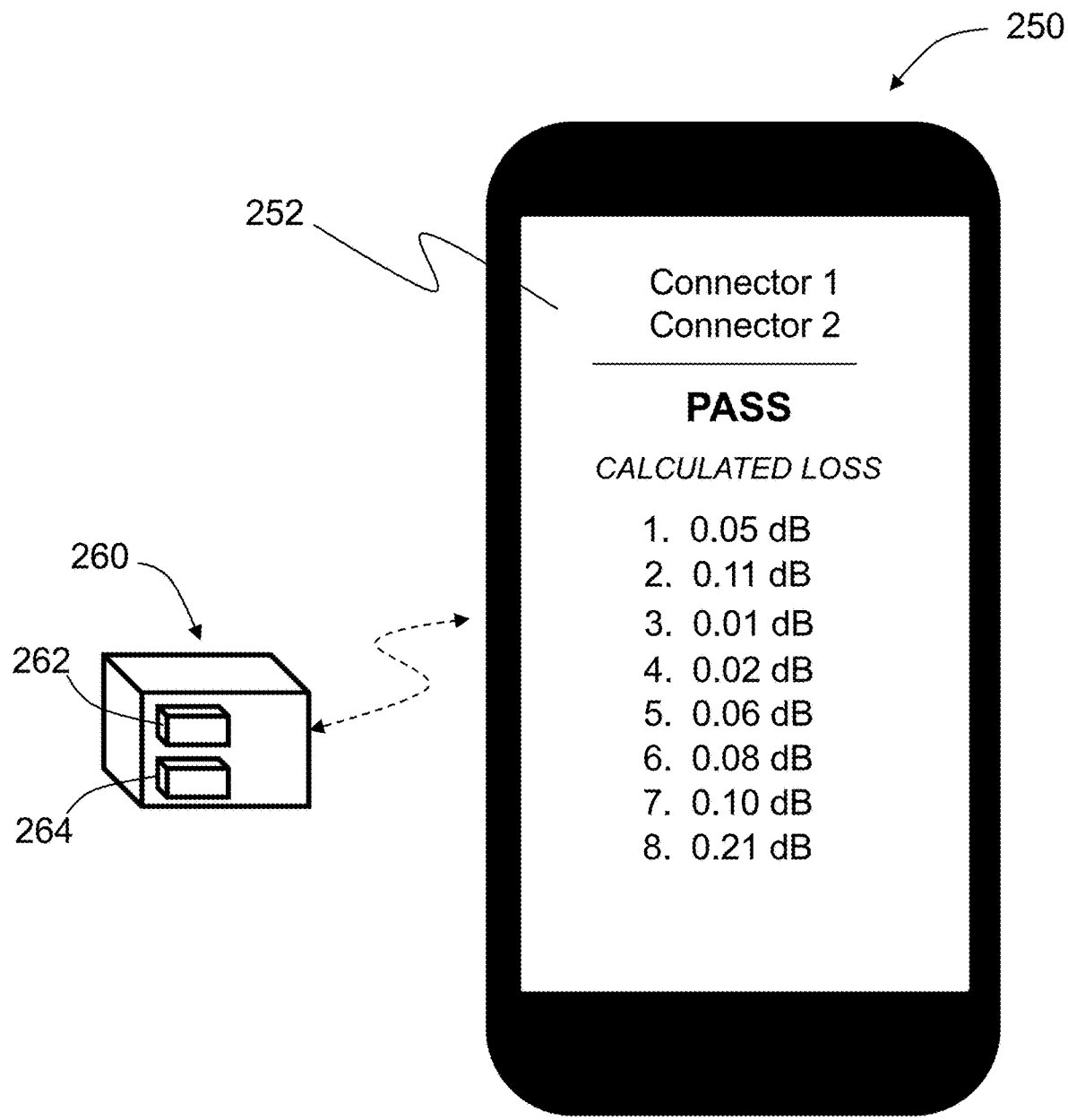
FIG. 8C shows the display of the data reading apparatus displaying calculated insertion loss estimates for each of the interfaced optical fiber pairs when the first and second connectors of FIGS. 8A and 8B are optically connected.

With reference to FIG. 8C, the data reading apparatus 250 includes data processing electronics 260 comprising for example a processor unit ("processor") 262 and a memory unit ("memory") 264. The memory unit 264 is used to store the information read from the data components in 40C-1 and 40C-2. The processor 262 is operably connected to the memory unit and is configured with instructions embodied in a non-tangible computer-readable medium (e.g., software, firmware, etc.) for calculating the insertion loss IL using the methods described above using the fiber offset data $D_{OF1}$ and $D_{OF2}$ read from the data components in 40C-1 and 40C-2 and stored in memory 264. In an example, the data reading apparatus 250 is the form of a smart phone (or other mobile computing device) and the software for calculating the estimated insertion losses is in the form of an insertion loss application or "app." In an example, the data processing electronics 260 comprising the processor 262 and the memory 264 as shown in FIG. 8C have the same or similar configuration and characteristics as the processing circuitry 182 described above in connection with FIG. 7B, but with the data processing electronics 260 adapted (e.g., via the aforementioned software or firmware) for performing the calculations for estimating the insertion loss as described herein.

In an example, the data reading apparatus 250 displays on the display 252 a result based on the comparison of the estimated insertion loss IL ($IL_{1-2}$) to an insertion loss tolerance $IL_{TOL}$. FIG. 8C shows the display 252 of the data reading apparatus 250 now showing the results of the calculation of the insertion loss IL (or $IL_{1-2}$) for the first and second cable connectors 20C-1 and 20C-2 (identified as "Connector 1" and "Connector 2") and the corresponding fiber pairs, identified in column form as "1, 2, 3, . . . " under the heading "Calculated Loss." The calculated insertion loss IL can be seen to vary between the fiber pairs, with the fiber pair "8" having the greatest estimated insertion loss of 0.21 dB. If the insertion loss tolerance $IL_{TOL}$ is 0.3 dB, all of the insertion losses for the fiber pairs fall substantially below this threshold (and beyond the estimated error in the insertion loss calculation), and the insertion losses expected from coupling the first and second cable connectors 20C-1 and 20C-tare all deemed acceptable. The display 252 shows this by conspicuously displaying (e.g., in green) the word "PASS." It is noted that the insertion loss tolerance $IL_{TOL}$ can have the estimated error on the insertion loss calculation "built in" so that, for example, an uncertainty of 0.03 dB would reduce an otherwise "error free" insertion loss tolerance $IL_{TOL}$ of 0.3 dB to 0.27 dB.

In the case where one or more of the calculated insertion losses IL for the fiber pairs exceeds the insertion loss tolerance $IL_{TOL}$, then the display 252 of the data reading apparatus 250 can conspicuously display (e.g., in red) the word "FAIL." In this case, the field technician can bring back to the display 252 the measurement data for each connector to assess whether one of the first and second cable connectors 20C-1 and 20C-2 has substantially greater fiber offsets than the other, and if there is an unfortunate combination of mismatches for a given fiber pair, etc.

The field technician can then decide whether one or both of the associated cable assemblies 10-1 and 10-2 need to be replaced, if one of the cable assemblies can simply be "turned around" and the opposite cable connector used, etc. In any case, the data reading apparatus 250 can be used in the manner as described above to read fiber offset data $D_{FO}$ and connector identification data Da from a different/new cable connector and the above process repeated to measure and qualify (certify) the insertion loss of the new optical connection of the two cable assemblies (e.g., say the original first cable assembly 10-1 and a new second cable assembly 10-2) to ensure an acceptable insertion loss for the optical connection within the fiber link.

Fiber Link Insertion Loss Evaluation and Certification

The above-described methods are mainly directed to determining an estimate of the insertion loss of a single connection between two cable connectors 20C-1 and 20C-2 by reading their respective cable data components 40C-1 and 40C-2. The above-described methods can also be applied to other portions or components of a fiber link, such as a portion that includes a telecommunications device 50.

Figure 9A:
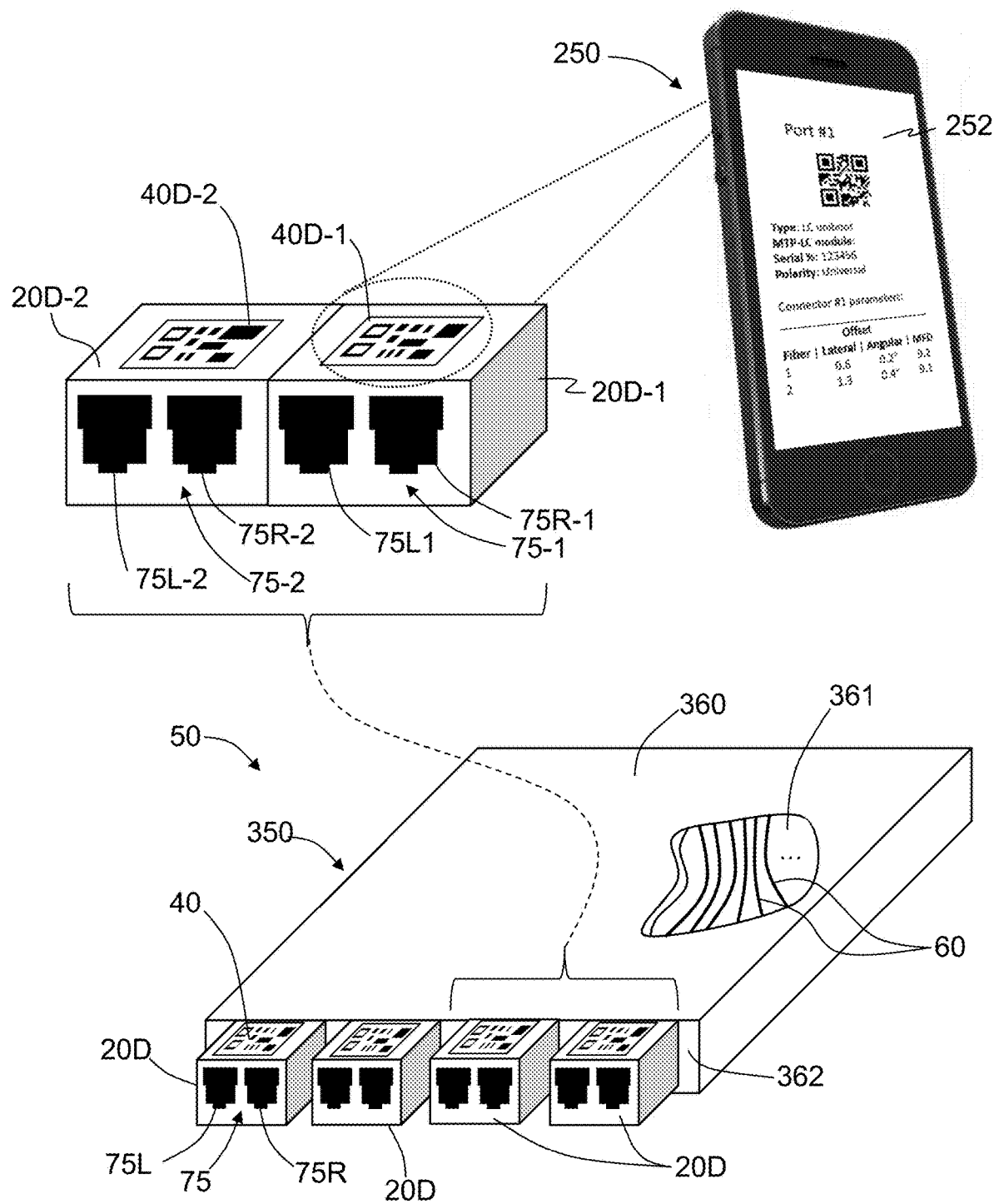
FIG. 9A is an elevated view of an example telecommunications device, with the close-up inset showing two device connectors and the data reading apparatus reading information from the data component of the rightmost device connector, and with the data reading apparatus displaying the information on a display screen.

FIG. 9A is a schematic diagram of an example telecommunications device 50 in the form of a patch panel or module 350. The patch panel 350 comprises a housing 360 with an interior 361 and a front end 362 that supports device connectors 20D each having at least one connector port 75. In the example shown, the least one connector port 75 of each device connector 20D comprises a pair of left and right sub-ports 75L and 75R. The close-up inset shows two of the four connector ports 75, denoted 75-1 and 75-2, with the different left and right sub-ports 75L1, 75R1 and 75L2, 75R2. The left and right sub-ports 75L and 75R can be for example "receive" and "transmit" in certain fiber links.

The housing 360 contains and operably supports (including selectively routing) the aforementioned optical waveguides 60 to other locations (not shown), as illustrated in the cut-away view of the housing interior 361. In an example, optical waveguides 60 comprise optical fibers.

Each device connector 20D has an associated or corresponding device data component 40D that contains fiber offset data $D_{OF}$ and connector identification data Da. The connector identification data Da for a given device connector 20D can include for example the device connector number (1, 2, 3, . . . ), the port numbers (e.g. 1L, 1R; 2L, 2R; . . . ), the device type, etc. In an example, left and right sub-ports 75L and 75R are associated with "fiber 1" and "fiber 2" of the waveguides 60 (fibers in this embodiment) of the patch panel 350.

FIG. 9A shows the data reading apparatus 250 reading the device data component 40D-1 on the "first" device connector 20D-1 that includes connector information about the first port 75-1 ("Port #1"), treating the left and right sub-ports 75L and 75R as a single port for the purposes of the insertion loss calculations. The connector identification data Da as read from the device data component 40D-1 is displayed on the display 252 of the data reading apparatus 250. The displayed connector identification data Da includes the connector (adapter) type CT as "LC uniboot," the connector type CT as "MTP-LC module," the connector (adapter information) CI as "Serial #123456, and the polarity P as "universal." The fiber offset data $D_{OF}$ is listed under the general heading "Offset" and includes the lateral displacement d under the heading "Lateral," the angular offset θ under heading "Angular" and the MDF w under the heading "MFD."

The two optical fibers 60 supported by the patch panel 350 at the first device connector 20D-1 are denoted on the display 252 as "Fiber 1" and "Fiber 2," with "Fiber 1" associated with the right-side sub-port 75R and "Fiber 2" associated with the left-side sub-port 75L. As discussed above, the fiber offset data $D_{FO}$ and the connector identification data Da read from the device data component 40D-1 on the first device connector 20D-1 is stored in memory 264 of the data reading apparatus 250. Additional connector information for the other device connectors 20D (i.e., 20D-2, . . . ) can also be read at the same time if desired.

Figure 9B:
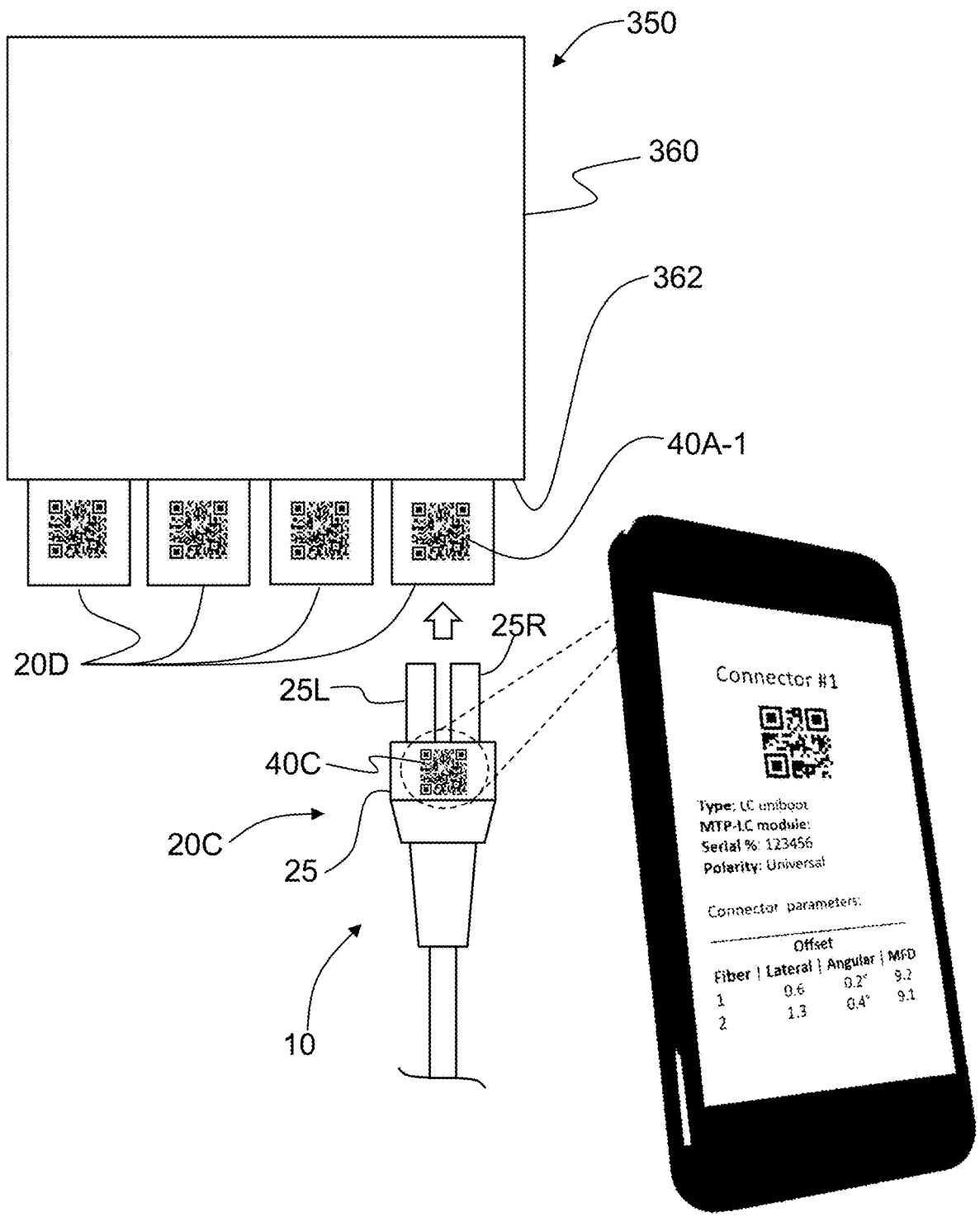
FIG. 9B is a top-down view of the telecommunications device of FIG. 9A and shows an end portion of a cable assembly wherein a cable connector is in the form of an LC duplex connector, and wherein the data reading apparatus is reading the information from the data component of the LC duplex connector and displaying the information on the display screen.

FIG. 9B is a top-down view of the patch panel 350 and shows an end portion of an example cable assembly 10 having a cable connector 20C in the form of a duplex LC Uniboot cable connector 20C such as used in the telecommunications industry and in particular for data center applications. The connector housing 25 of the example cable connector 20C includes first and second connector housing sections 25L and 25R that extend from the front end 27 of the cable connector 20C in a direction parallel the connector axis AXC and reside on opposite sides thereof. The first and second connector housing sections 25L and 25R respectively operably support first and second fibers 30, i.e., a first fiber 30L-1 and a second fiber 30R-1.

Figure 9C:
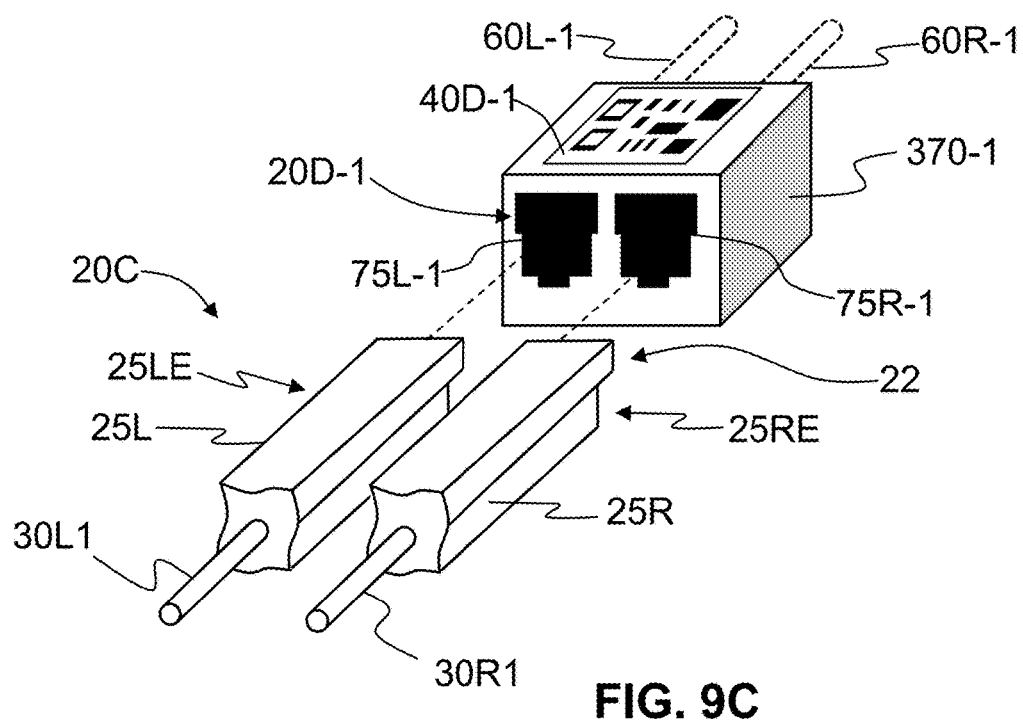
FIG. 9C is a schematic, close-up elevated view of two connector housing sections that engage sub-ports of the device connector.

FIG. 9C is close-up cut-away view of the end portion of the cable connector 20C and the front-on view of the first device connector 20D-1. With respect to FIGS. 9B and 9C, the first and second (left and right) connector housing sections 20L and 20R include respective end portions 20LE and 20RE that define the connector end 22 and that are configured to engage the left and right ports 372L and 372R of the adapter port 372 so that the first and second (right and left) optical fibers 60L-1 and 60R-1 of the first device connector 20D interface with and become respectively aligned and optically coupled to the first and second (left and right) optical fibers 30L-1 and 30R-1, respectively operably supported by the first and second (right and left) connector housing sections 25R and 25L.

Figure 9D:
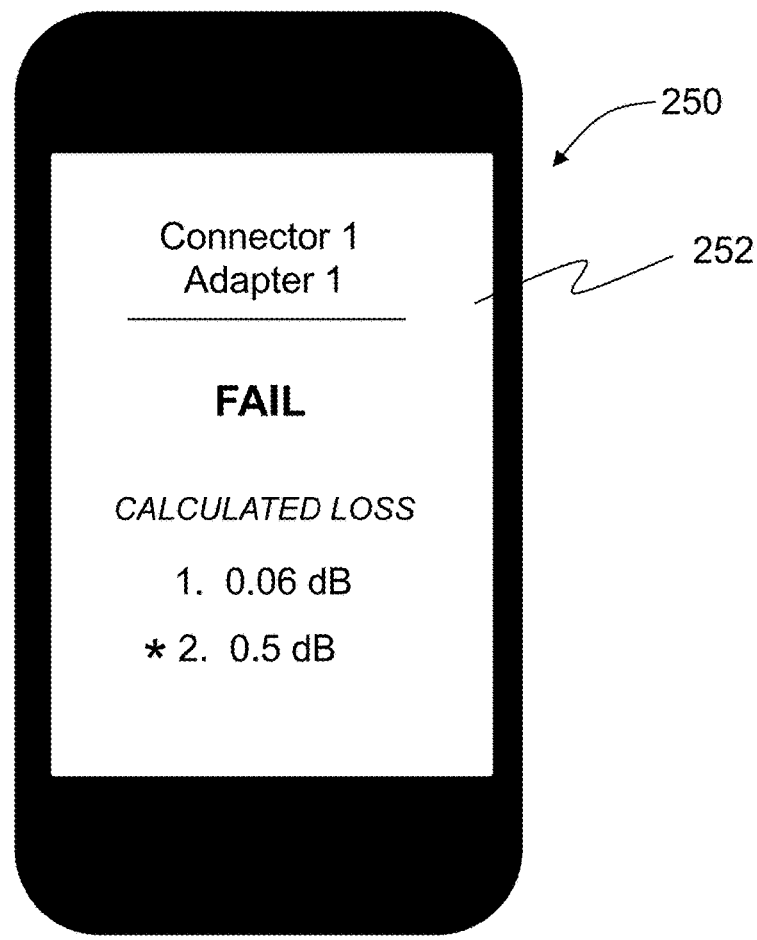
FIG. 9D shows the data reading apparatus with the display screen displaying the results of calculations of the estimated insertion loss between each of the interfaced optical fiber pairs of the LC duplex connector and the telecommunications device based on the connector information obtained from the respective data components.

With reference now to FIG. 9D, the data reading apparatus 250 calculates the insertion loss IL for the two sets of interfaced fibers, namely fibers 30L-1 and 60L-1 and fibers 30L-2 and 60R-2, of the first device connector 20D-1. The display 252 of the data reading apparatus 250 displays the calculated insertion losses for the two sets of interfaced fibers and display the "PASS" or "FAIL" message, depending on whether any of the two sets of interfaced fibers exceeds the insertion loss tolerance $IL_{TOL}$. In the example shown in FIG. 9D, the calculated estimate of the insertion loss for the "second" fiber pair exceeds the insertion loss tolerance (0.5 dB verses a 0.3 dB tolerance for example) so that the display 252 shows the word "FAIL." At this point, the field technician can try a different cable assembly 10 or a different device connector 20D on the patch panel 350.

Fiber Link of a Telecommunications System

Figure 10:
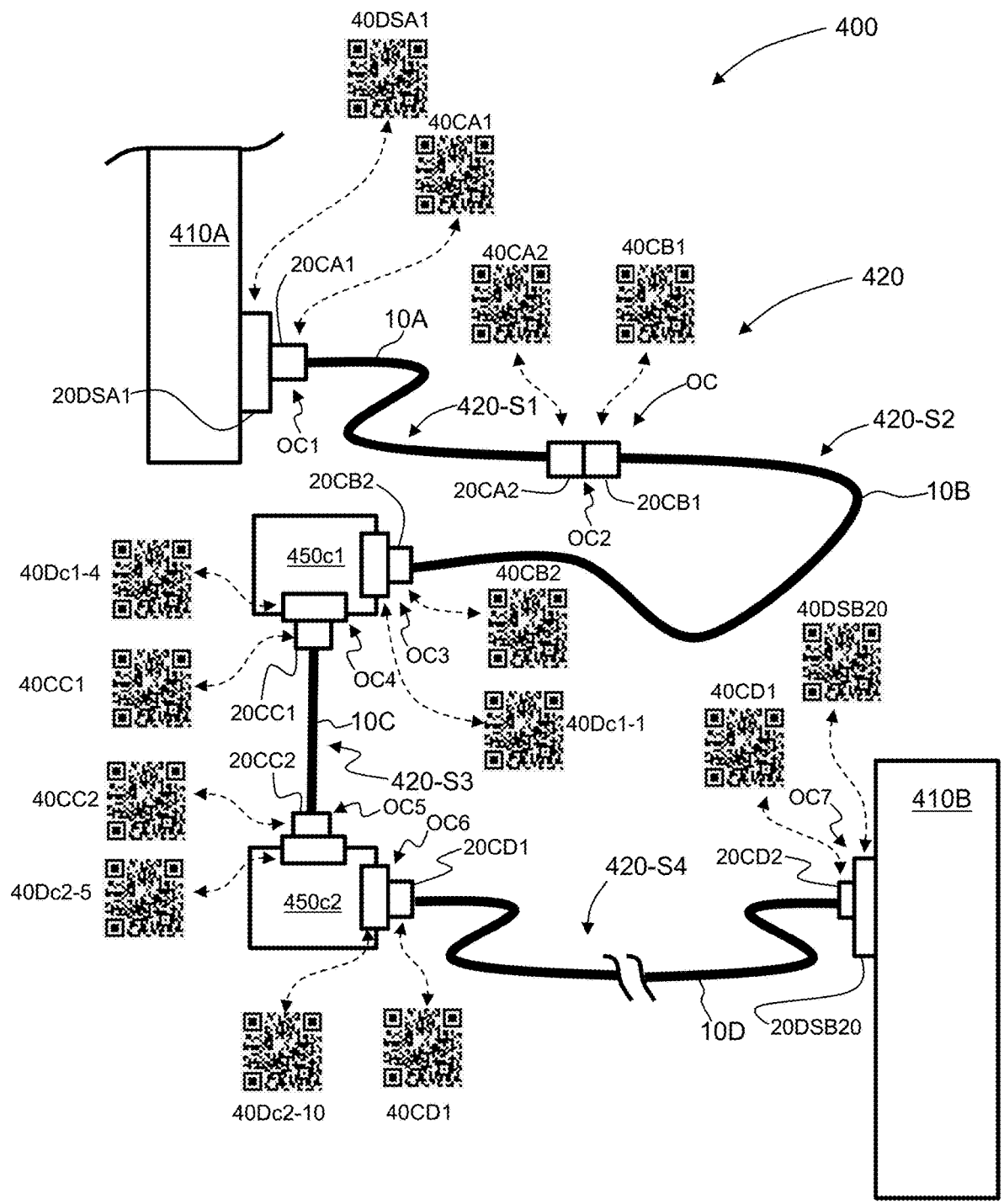
FIG. 10 is a schematic diagram of an example optical telecommunications system that includes an optical fiber link having four sections, illustrating an example of using the systems and methods herein to qualify the insertion loss for the fiber link using estimates of the insertion loss at the different optical connection points of the fiber link.

FIG. 10 is a schematic diagram of an example optical telecommunications system ("OT system") 400 of the type that is often used in a data center. The OT system 400 includes a first server 410A and a second server 410B in optical communication over a fiber link 420. The first server 410A includes a first rack-mounted patch panel 350A that includes a first device connector 20DSA-1

A first cable connector 20CA-1 of a first cable assembly 10A is optically connected to the first device connector 20DSA-1 of the first server 410A to define a first optical connection OC1.

The second cable connector 20CA-2 of the first cable assembly 10A is optically connected to a first cable connector 20CB-1 of a second cable assembly 10B to define a second optical connection OC2.

The second cable connector 20CB-2 of the second cable assembly 10B is optically connected to a telecommunications device 50 in the form of a first optical fiber module ("module") 450c1 at a first device connector 20Dc1-1 to define a third optical connection OC3.

A third cable assembly 10C has a first and second cable connectors 20CC-1 and 20CC-2, with the first cable connector 20CC-1 optically connected to a fourth device connector 20Dc1-4 of the first module 450A to define a fourth optical connection OC4.

The second cable connector 20CC-2 of the third cable assembly is optically connected to a fifth device connector 20Dc2-5 of a second module 450c2 to define a fifth optical connection OC5.

A fourth cable assembly 10D has first and second cable connectors 20CD-1 and 20CD-2, with the first cable connector 20CD-1 optically connected to a tenth device connector 20Dc2-10 of the second module 450c2 to define a sixth optical connection OC6.

The second cable connector 20CD-2 is optically connected to a twentieth device connector 20DSB-20 of the second patch panel 350B of the second server 420B to define a seventh optical connection OC7.

Thus, there are a total of seven optical interconnections OC for the fiber link 420 and these are denoted OC1 through OC7. Table 1 below summarizes the seven optical interconnections OC1 through OC1. The corresponding data components 40 for each connector 20 for the given optical connection OC are shown in FIG. 10 and summarized in Table 1 below.

TABLE 1

| OC | First connector | Second connector | Data Components |
|---|---|---|---|
| OC1 | 20DSA-1 | 20CA-1 | (40DSA-1, 40CA-1) |
| OC2 | 20CA-2 | 20CB-1 | (40CA-2, 40CB-1) |
| OC3 | 20CB-2 | 20Dc1-1 | (40CB-2, 40Dc1-1) |
| OC4 | 20CC-1 | 20Dc1-4 | (40CC-1, 40Dc1-4) |
| OC5 | 20CC-2 | 20Dc2-5 | (40CC-2, 40Dc2-5) |
| OC6 | 20Dc2-10 | 20CD-1 | (40Dc2-10, 40CD1) |
| OC7 | 20CD-2 | 20DSB20 | (40CD2, 40DSB20) |

The fiber link 420 can be divided into sections 420S, such as four main sections 420-S1 through 420-S4 as shown in FIG. 10 as defined mainly by the four cable assemblies 10A through 10D.

The fiber link 420 has a total insertion loss $IL_{FL}$ from the first server 410A to the second server 410B due to transmission losses at the optical interconnections OC1 through OC7. The insertion loss $IL_{FL}$ for the fiber link 420 must meet a total insertion loss requirement, i.e., be less than an overall or total insertion loss tolerance $IL_{TOL-T}$. As explained above, an overall or total insertion loss such as the fiber link insertion loss $IL_{FL}$ for the fiber link 420 can be found by the sum of the insertion losses IL incurred at the optical interconnections OC along the fiber link for each optical fiber pair being connected. In an example, each local insertion loss at a given optical interconnection OC can be determined using the methods described above by calculating the estimated insertion losses using the fiber offset data associated with each of the optical interconnections OC. In another example, the local insertion losses for a portion of the fiber link 420 is known by direct measurement of light transmitted over the portion of the fiber link.

Before forming the fiber link 420, in the example methods disclosed herein the optical connections OC need to be evaluated using the insertion loss "PASS/FAIL" criteria for each optical connection. FIG. 10 shows and Table 1 lists the various data components 40 for associated with the various connectors 20. While the data components 40 are shown in FIG. 10 as being the same, this is just for ease of illustration and the different data components 40 contain different fiber offset fata $D_{FO}$ and connector identification data Da.

In one example of assembling the fiber link 420, a given optical connection OC is made only if the estimated insertion loss IL for the optical connection is less than the insertion loss tolerance $IL_{TOL}$ for the given optical connection using the methods described above.

In another example, the insertion loss IL is known for one or more sections 420S of the fiber link 420. By way of example, assume that the insertion loss $IL_{2-4}$ is known for sections 420S-S2 through 420-S4, i.e., from the second cable assembly 10B to the second server 410B. This situation can occur, for example, by building the fiber link FL starting at the second server 410B and working toward the first server 410A and either making direction insertion loss measurements or by using the insertion loss estimation methods described herein. In either case, all the insertion losses $IL_3$ through $IL_7$ for the optical connections OC3 through OC7 are known (either via estimate calculations or by direction measurement after the fiber link sections are established) and can be used to establish a tolerance on insertion loss $IL_{2-4}$ for fiber link sections 410-S2 through 410-S4.

If the insertion loss $IL_{2-4}$ is very low for all of the optical fibers 30 that make up the second, third and fourth sections 420-S1, 420-S2 and 420-D3 of the fiber link 420, then the insertion loss tolerances for $IL_1$ and $IL_2$ for the optical connections OC1 and OC2 for the fiber link section 410-S1 can be relaxed relative to a standard default tolerance, as long as the overall or total fiber link insertion loss $IL_{FL} < IL_{TOL-T}$, which constitutes a qualified condition for the fiber link 420. This method has the advantage of being able to make use of cable assemblies 10 that would otherwise be rejected based on a fixed insertion loss tolerance for all optical connections OC in the fiber link 420.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of estimating insertion loss of an anticipated optical connection between a first optical connector that supports at least one first optical fiber and a second optical connector that supports at least one second optical fiber, comprising:
   extracting first connector information stored on the first optical connector to obtain extracted first connector information;
   extracting second connector information stored on the second optical connector to obtain extracted second connector information; and
   calculating an estimated insertion loss of the anticipated optical connection between the first optical connector and the second optical connector using the extracted first connector information and the extracted second connector information.

2. The method according to claim 1, further comprising:
   comparing the estimated insertion loss with a threshold insertion loss; and
   forming a maintained physical connection between the first and second connectors only if the estimated insertion loss is below the threshold insertion loss.

3. The method according to claim 1, wherein the at least one first optical fiber comprises a plurality of n first optical fibers and the at least one second optical fiber comprises a plurality of n second optical fibers, where n is an integer equal to or greater than 2.

4. The method according to claim 1, wherein the first and second optical connectors comprise cable connectors that respectively terminate first and second cables to form respective first and second cable assemblies.

5. The method according to claim 1, wherein the first optical connector comprises a cable connector that terminates a cable to form a cable assembly, and wherein the second optical connector comprises a device connector of a telecommunications device.

6. The method according to claim 1, wherein the first connector information and the second connector information are stored in respective first and second data components respectively located on or proximate to the first and second optical connectors.

7. The method according to claim 6, wherein the first connector information and the second connector information are extracted from the first and second data components using a data reading apparatus.

8. The method according to claim 7, wherein the calculating the estimated insertion loss is performed using the data reading apparatus and is based on an insertion loss equation.

9. The method according to claim 7, wherein the data reading apparatus comprises a mobile computing device, and wherein the calculating the estimated insertion loss is carried out within the mobile computing device using an insertion loss application that calculates the insertion loss based on an insertion loss equation.

10. The method according to claim 1, wherein the first and second connector information are respectively stored in first and second bar codes.

11. The method according to claim 1, wherein the first connector information and the second connector information respectively comprise first and second fiber offset data for the at least one first fiber and the at least one second fiber, and wherein the calculating the estimated insertion loss is based on said first and second fiber offset data.

12. The method according to claim 11, further comprising measuring the first and second optical connectors to obtain the first and second fiber offset data.

13. The method according to claim 12, wherein said measuring comprises performing non-contact measurements of the first and second optical connectors.

14. The method according to claim 11, wherein the at least one first optical fiber comprises a first fiber end face, a first mode field diameter $\omega_1$ and a first core central axis, the at least one second optical fiber comprises a second fiber end face, a second mode field diameter $\omega_2$ and a second core central axis, and wherein the first fiber offset data and the second fiber offset data are collectively used to determine any one or more of:
   i) a spacing S between the first and second fiber end faces;
   ii) an angular offset $\theta$ between the first and second fiber end faces;
   iii) a lateral displacement d between the first core central axis and the second core central axis; and iv) a difference in size between the first mode field diameter $\omega_1$ and the second mode field diameter $\omega_2$.

15. The method according to claim 1, further comprising: qualifying a potential new fiber link that would result from the anticipated optical connection between the first optical connector and the second optical connector, wherein the existing fiber link has an existing fiber link insertion loss $IL_{FL}$, the estimated insertion loss of the anticipated optical connection is $IL_{1-2}$, and said qualifying includes:

estimating a total insertion loss of the new fiber link as $IL_T = IL_{1-2} + IL_{FL}$; and comparing the estimated total insertion loss $IL_T$ of the new fiber link to a total insertion loss tolerance $IL_{TOL-T}$ of the new fiber link determine whether $IL_T < IL_{TOL-T}$, wherein the condition $IL_T < IL_{TOL-T}$ constitutes a qualified condition for the new fiber link.

16. The method according to claim 15, further comprising:

forming a maintained physical connection between the first and second optical connectors if $IL_T < IL_{TOL-T}$.

17. The method according to claim 15, wherein the existing fiber link comprises one or more optical connections, and further comprising determining the existing fiber link insertion loss $IL_{FL}$ by either:

i) estimating the insertion loss for each of the one or more optical connections and adding the estimated insertion losses; or ii) measuring the existing fiber link insertion loss.

18. A method of estimating an insertion loss of an anticipated optical connection between a first optical connector that supports first optical fibers and a second optical connector that supports second optical fibers, comprising:

securing to the first optical connector a first data component that includes first fiber offset data for the first optical fibers;

securing to the second optical connector a second data component that includes second fiber offset data for the second optical fibers;

using a data reading apparatus to read the first and second data components and obtain the first and second fiber offset data;

calculating in the data reading apparatus an estimated insertion loss between the first and second optical connectors by using the obtained first and second fiber offset data; and comparing the estimated insertion loss to a threshold insertion loss and forming a maintained physical connection between the first and second optical connectors if the estimated insertion loss is less than the threshold insertion loss.

19. The method according to claim 18, wherein each of the first optical fibers comprises a first fiber end face, a first mode field diameter $\omega_1$, and a first core central axis, wherein each of the second fibers comprises a second fiber end face, a second mode field diameter $\omega_2$, and a second core central axis, and wherein the first and second fiber offset data defines any one or more of the following offset parameters used for the calculating of the estimated insertion loss:

i) a spacing S between the first and second end faces;

ii) an angular offset $\theta$ between the first and second end faces;

iii) a lateral displacement d between the first core central axis and the second core central axis; and iv) a difference in size between the first mode field diameter $\omega_1$ and the second mode field diameter $\omega_2$.

20. A system for estimating insertion loss of an anticipated optical connection between a first optical connector that supports at least one first optical fiber and a second optical connector that supports at least one second optical fiber, comprising:

a first data component that stores first connector information and that resides on or near the first optical connector;

a second data component that stores second connector information and that resides on or near the second optical connector;

a data reading apparatus configured to read the first data component and the second data component to extract the first connector information and second connector information stored therein, and wherein the data reading apparatus is also configured to, with instructions embodied in a non-transitory computer-readable medium, calculate the estimated insertion loss of the anticipated optical connection between the first and second fibers using the extracted first connector information and the extracted second connector information and performs a comparison of the estimated insertion loss to an insertion loss tolerance.

\* \* \* \* \*

UNITED STATES PATENT AND TRADEMARK OFFICE
CERTIFICATE OF CORRECTION

PATENT NO. : 11,150,417 B2
APPLICATION NO. : 17/000760
DATED : October 19, 2021
INVENTOR(S) : Grzegorz Tosik Page 1 of 1

It is certified that error appears in the above-identified patent and that said Letters Patent is hereby corrected as shown below:

On the Title Page

In Column 1, item (73), Assignee, Line 1, delete "Coming" and insert -- Corning --, therefor.

In Column 1, item (73), Assignee, Line 2, delete "Coming," and insert -- Corning, --, therefor.

In Column 2, item (57), Abstract, Line 3, delete "having" and insert -- having at --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*